United States Patent [19]
Neiger et al.

[11] Patent Number: 6,088,205
[45] Date of Patent: Jul. 11, 2000

[54] ARC FAULT DETECTOR WITH CIRCUIT INTERRUPTER

[75] Inventors: Benjamin B. Neiger, New York; Roger M. Bradley, North Belmore; James N. Pearse, Dix Hills; William J. Rose, Woodbury; Steve Campolo, Valley Stream, all of N.Y.

[73] Assignee: Leviton Manufacturing Co., Inc., Little Neck, N.Y.

[21] Appl. No.: 08/995,130

[22] Filed: Dec. 19, 1997

[51] Int. Cl.[7] ............................................. H02H 3/00
[52] U.S. Cl. ............................................................. 361/42
[58] Field of Search .................................. 361/42–50, 63, 361/78, 79, 88, 91, 93, 94, 111, 93.1, 93.6; 702/58, 134, FOR 103, FOR 104, FOR 105, FOR 107; 324/508, 509, 512, 520, 525

[56] References Cited

U.S. PATENT DOCUMENTS

| | | | |
|---|---|---|---|
| 4,376,243 | 3/1983 | Renn et al. | 361/93 |
| 4,466,071 | 8/1984 | Russell, Jr. | 364/492 |
| 4,658,322 | 4/1987 | Rivera | 361/37 |
| 4,709,293 | 11/1987 | Gershen et al. | 361/50 |
| 4,878,144 | 10/1989 | Nebon | 361/96 |
| 5,185,684 | 2/1993 | Beihoff et al. | 361/45 |
| 5,202,662 | 4/1993 | Bienwald et al. | 361/42 |
| 5,206,596 | 4/1993 | Beihoff et al. | 361/45 |
| 5,223,795 | 6/1993 | Blades | 361/113 |
| 5,224,006 | 6/1993 | Mackenzie et al. | 361/45 |
| 5,280,404 | 1/1994 | Ragsdale | 361/113 |
| 5,432,455 | 7/1995 | Blades | 361/113 |
| 5,434,509 | 7/1995 | Blades | 361/113 |
| 5,459,630 | 10/1995 | MacKenzie et al. | 361/45 |
| 5,561,505 | 10/1996 | Lewis | 361/225 |
| 5,590,012 | 12/1996 | Dollar, II | 361/113 |
| 5,715,125 | 2/1998 | Neiger et al. | 361/42 |
| 5,805,397 | 9/1998 | MacKenzie | 361/42 |
| 5,805,398 | 9/1998 | Rae | 361/42 |
| 5,815,352 | 9/1998 | MacKenzie | 361/42 |
| 5,818,237 | 10/1998 | Zuercher et al. | 361/42 |
| 5,835,321 | 11/1998 | Elms et al. | 361/45 |
| 5,847,913 | 12/1998 | Turner et al. | 361/93 |

*Primary Examiner*—Ronald W. Leja
*Attorney, Agent, or Firm*—Paul J. Sutton

[57] ABSTRACT

An arc fault circuit interrupter (AFCI) device functions to provide protection from potentially dangerous arc faults. The arc fault detector can be used stand alone or in combination with circuit interrupting devices such as IDCIs and ALCIs. The AFCI device detects both AC line frequencies and high frequencies associated with arcing. Both average and instantaneous values of both AC line frequency and high frequency arcing signals are processed to generate an arc fault signal. The trip mechanism of the device trips on the occurrence of either an arc fault or a ground fault. The device allows the arc detector to differentiate between destructive high level arcing and low level arcing such as generated by typical household appliances and equipment. This serves to decrease the occurrence of false tripping. The device also includes a timer circuit, which permits the user to temporarily disable the arc detector, and includes communication means to permit the device to communicate the occurrence and location of the arc fault to a centralized monitoring station.

55 Claims, 18 Drawing Sheets

ARC FAULT DETECTOR WITH CIRCUIT INTERRUPTER

FIELD OF THE INVENTION

The present invention relates to an apparatus and method for arc fault detection and more particularly relates to an apparatus and method for both a stand alone arc fault detector and an arc fault detector combined with a circuit interrupter device.

BACKGROUND OF THE INVENTION

Circuit breakers, fuses and ground fault circuit interrupters (GFCIs) are commonly used devices for protecting people and property from dangerous electrical faults. Fatalities and loss of property, however, still occur, being caused by electrical faults that go undetected by these protective devices. One such type of electrical fault that typically goes undetected are arc faults. Arcs are potentially dangerous due to the high temperatures contained within them. Thus, they have a high potential of creating damage, mostly through the initiation of fires. An arc, however, will only trip a GFCI it if produces sufficient current leakage to ground. In addition, an arc will trip a breaker only if the current, flowing through the arc, exceeds the trip parameters of the thermal/magnetic mechanism of the breaker. Therefore, an additional type of protection device is needed to detect and interrupt arcs that do not fit these criteria. An arc detector whose output is used to trigger a circuit interrupting mechanism is referred to as an arc fault circuit interrupter (AFCI).

According to the Consumer Product Safety Commission (CPSC) in 1992, it was estimated that "there were 41,000 fires involving home electrical wiring systems . . . which resulted in 320 deaths, 1600 injuries and $511 million in property losses." The CPSC further stated that "an electrically caused fire may occur if electrical energy is unintentionally converted to thermal energy and if the heat so generated is transferred to a combustible material at such a rate and for such a time as to cause the material to reach its ignition temperature." The two main causes of unintentional conversion of electrical energy to heat are excessive current and arcing. Circuit breakers and fuses are currently available to mitigate the results of excessive current, but no commercial system exists to mitigate arcing.

A dangerous condition may develop whenever prolonged arcing exists regardless of whether it involves industrial, commercial or residential power lines. However, mobile homes and especially homes with antiquated wiring systems are particularly vulnerable to fires started due to electrical causes. CPSC studies have shown that the frequency of wiring system fires is disproportionately high in homes over 40 years old.

The causes of arcing are numerous, for example: aged or worn insulation and wiring; mechanical and electrical stress caused by overuse, over currents or lightning strikes; loose connections; and excessive mechanical damage to insulation and wires. Two types of arcing occur in residential and commercial buildings: contact arcing and line arcing. Contact (or series) arcing occurs between two contacts in series with a load. Therefore, the load controls the current flowing in the arc. Line (or parallel) arcing occurs between lines or from a line to ground. Thus, the arc is in parallel with any load present and the source impedance provides the only limit to the current flowing in the arc. It is important for any arc detection system to be able to detect both contact and line arcing and to act appropriately depending upon the severity of the arc.

An example of contact arcing is illustrated in FIG. 1. The conductors 114, 116 comprising the cable 110, are separated and surrounded by an insulator 112. A portion of the conductor 114 is broken, creating a series gap 118 in conductor 114. Under certain conditions, arcing will occur across this gap, producing a large amount of localized heat. The heat generated by the arcing might be sufficient to break down and carbonize the insulation close to the arc 119. If the arc is allowed to continue, enough heat will be generated to start a fire.

A schematic diagram illustrating an example of line arcing is shown in FIG. 2. Cable 120 comprises electrical conductors 124, 126 covered by outer insulation 122 and separated by inner insulation 128. Deterioration or damage to the inner insulation at 121 may cause line fault arcing 123 to occur between the two conductors 124, 126. The inner insulation could have been carbonized by an earlier lightning strike to the wiring system, or it could have been cut by mechanical action such as a metal chair leg cutting into an extension cord.

The potentially devastating results of arcing are widely known and a number of methods of detecting arcs have been developed in the prior art. A large percentage of the prior art refers to detecting the high frequency signals generated on the AC line by arcs. FIG. 3 shows the wide spectrum noise 162 produced on the AC line by an arc. It is superimposed over the AC line voltage 164. An analysis of the arc waveform, using a frequency spectrum analyzer, shows that the overtones and high frequency harmonics contained within the waveform extend well into the GHz range. A graph illustrating the frequency spectrum analysis of the waveform 162 shown in FIG. 3 is shown in FIG. 4.

One major problem associated with any type of arc detection is false tripping. False tripping occurs when an arc detector produces a warning output, or disconnects a section of wiring from the voltage source, when a dangerous arcing condition does not actually exist. The two major causes of false tripping are normal appliance arcing and the inrush currents created by inductive and capacitive appliances. These two situations generate high frequency signals on the power line that are very similar to those generated by dangerous arcing. Thus, to be viable commercial devices, arc detectors must be able to distinguish arcing signals from the signals created by normal appliance use.

A wide range of prior art exists in the field of arc detection. Some of the prior art refers to specialized instances of arcing. For example, U.S. Pat. No. 4,376,243, issued to Renn, et al., teaches a device that operates with DC current. U.S. Pat. No. 4,658,322, issued to Rivera, teaches a device that detects arcing within an enclosed unit of electrical equipment. U.S. Pat. No. 4,878,144, issued to Nebon, teaches a device that detects the light produced by an arc between the contacts of a circuit breaker.

In addition, there are several patents that refer to detecting arcs on AC power lines that disclose various methods of detecting high frequency arcing signals. For example, U.S. Pat. Nos. 5,185,684 and 5,206,596, both issued to Beihoff et al., employ a complex detection means that separately detects the electric field and the magnetic field produced around a wire. U.S. Pat. No. 5,590,012, issued to Dollar, teaches measuring the high frequency current in a shunted path around an inductor placed in the line, which can be the magnetic trip mechanism of a breaker. In a second detection circuit, proposed by Dollar, high frequency voltage signal is extracted from the line via a high pass filter placed in parallel with any load.

Various methods can be found in the prior art to authenticate arcing and to differentiate arcing from other sources of noise. Much of the prior art involves complicated signal processing and analysis. U.S. Pat. No. 5,280,404, issued to Ragsdale, teaches looking for series arcing by converting the arcing signals to pulses and counting the pulses.

In addition, several patents detect arcing by taking the first derivative or second derivative of the detected signal. For example, U.S. Pat. No. 5,224,006, issued to MacKenzie et al., and U.S. Pat. Nos. 5,185,684 and 5,206,596, issued to Beihoff et al. disclose such a device.

Blades uses several methods to detect arcs as disclosed in U.S. Pat. Nos. 5,223,795, 5,432,455 and 5,434,509. The Blades device is based on that fact that detected high frequency noise must include gaps at each zero crossing, i.e., half cycle, of the AC line. To differentiate arcing from other sources of noise, the Blades device measures the randomness and/or wide bandwidth characteristics of the detected high frequency signal. The device taught by U.S. Pat. No. 5,434,509 uses the fast rising edges of arc signals as a detection criterion and detects the short high frequency bursts associated with intermittent arcs.

U.S. Pat. No. 5,561,505, issued to Zuercher et al., discloses a method of detecting arcing by sensing cycle to cycle changes in the AC line current. Differences in samples taken at the same point in the AC cycle are then processed to determine whether arcing is occurring.

SUMMARY OF THE INVENTION

The arc detector of the present invention functions to monitor and sense the line voltage and current present on the AC power line for the occurrence of arcing. Both high frequency energy and AC line frequency energy are utilized in the detection of arc faults. The output of the detector can be used to activate a circuit interrupting mechanism, sound an audio alarm and/or alert a central monitoring station.

The arc detector of the present invention can be implemented as a stand alone device or can be implemented in combination with an existing circuit interrupting device. The term 'circuit interrupting device' is defined to mean any electrical device used to interrupt current flow to a load and includes, but is not limited to devices such as Ground Fault Circuit Interrupters (GFCIs), Immersion Detection Circuit Interrupters (IDCIs) or Appliance Leakage Circuit Interrupters (ALCIs).

A novel feature of the arc detector of the present invention is that it combines an arc detector, i.e., arc fault circuit interrupter (AFCI) with other types of circuit interrupting devices such as a GFCI, IDCI or ALCI to create an AFCI/GFCI, AFCI/IDCI or AFCI/ALCI multipurpose device, respectively. In the case of a GFCI, the arc detection circuitry can be placed onboard the same silicon chip typically used in today's GFCI devices. Indeed, some of the pins of commonly used GFCI integrated circuits can be converted for multifunction operation. The AFCI can be powered from the same power supply that provides power to the circuit interrupting device. This combined approach results in reduced manufacturing costs. The mechanical parts of the circuit interrupting device such as the trip relay and the mechanical contact closure mechanisms now serve dual purposes. In addition, adding AFCI circuitry to an existing circuit interrupting device is a logical enhancement of such present day devices. In particular, it is logical to enhance a GFCI with AFCI circuitry since a GFCI can detect arcing in certain situations including any condition whereby an arc produces leakage current to ground.

In the AFCI/GFCI device of the present invention, the current waveform present on the AC line is extracted via a toroidal current to voltage transformer. The voltage that is generated across the secondary windings of the transformer is fed into two separate paths.

In the first path, the 50 or 60 Hz AC line frequency content of the transformer output is filtered from the input signal. This AC line frequency signal provides an indication of the amount of current flowing through the AC power line. In the second path, the high frequency content of the transformer output is filtered from the input signal. The high frequency signal is indicative of the level of arcing present on the AC power line.

Within each of the two paths, the signals are filtered by a second stage filter and then rectified. The two rectified signals are each split to produce peak and average levels for the AC line frequency and high frequency signals. Excessively high peaks in either the AC line frequency or high frequency path instantly causes the relay mechanism of the AFCI/GFCI to trip, disconnecting the load from the power source.

The absolute average levels of the AC line frequency and high frequency signals are converted to a DC potential and compared to a set of predefined voltages. If the average high frequency signal is greater than the level expected from normal appliance arcing at the associated average AC line frequency level, then an output signal is generated. This output signal is then used to trip the device or produce an alarm both being controlled via a timer mechanism. A user can disable the AFCI function temporarily or permanently so that devices with normally high levels of arcing, such as arc welders, can be operated without tripping the arc detector.

The detection of high average AC line frequency or high frequency signals causes the device to immediately trip. This immediate tripping cannot be disabled via the timer mechanism described above. In addition, the ground fault protection mechanism and excessive arc current and AC line current detection cannot be disabled. This is so a user is continually protected from the potential dangers associated with these conditions.

An advantage of the present invention is that separating the detection of the AC line current and the high frequency energy generated by the arc provides increased immunity to noise. The arc detection device detects the current flowing in the AC line across a wide range of frequencies. By splitting the two current signal components and setting a maximum permitted level of high frequency component for a given level of AC line current, the arc detector provides increased immunity to noise.

In addition, the arc detector of the present invention simultaneously performs average and peak detection of AC line current and high frequency arcing signal. The peak AC line current and high frequency arcing signals are detected to provide an immediate response to large increases in either arcing or AC line current. The arc detector will trip the relay the instant either the peak AC line current signal or the peak high frequency arcing signal crosses a predetermined threshold.

The arc detector also incorporates a fast trip circuit which functions to open the relay when excessive average AC line current and high frequency arcing levels are detected. If either the average AC line current or the average high frequency arcing signal rises above a level considered to be dangerous, the device will trip very quickly. The maximum level permitted for the average AC line current is approximately 1.5 times the rated AC line current. The limit set for the average high frequency signal is a level of average arcing that is known to be dangerous.

When the levels of average AC line current and high frequency signal are lower than their respective maximums, the arc detector utilizes various trip levels for arcing, dependent upon the level of the average AC current flowing. Furthermore, the arc detector trips at a slower speed at these lower and thus less dangerous arcing levels. This slower trip response time provides noise immunity against short lived noise and arcs, such as arcs generated when toggling a switch. By incorporating various trip times, dependent on the level of arcing detected, the arc detector can extinguish dangerous arcs quickly while providing high noise immunity for lower level arcs.

The arc detector also incorporates an automatic bypass timer to permit otherwise normally safe arcing. Rather than include an on/off fixed switch, which would function to completely enable or disable the arc detector, the present invention incorporates a logical switch. This logic switch provides a user with the option of disabling the arc detector for as long as the switch is off or disabling the arc detector temporarily while arcing appliances are in use. This permits the use of appliances that normally generate high amounts of arcing that would otherwise cause the arc detector to trip. When the arc detector is temporarily disabled, it automatically returns to the enabled state after the appliance has been disconnected. This scheme has the advantage that the device cannot accidentally be permanently disabled by the user. An important feature of this scheme is that the arcing appliance can be turned on and off within the given time period without tripping the arc detector.

Further, the arc detector includes circuitry to transmit messages using any suitable communication means pinpointing the location of arc fault. For example, such communication means may comprise any power line carrier, RF, twisted pair or IR communication technology. An example of power line carrier communications include Lon Works and CEBus communications systems. By way of example only, the present invention incorporates a communications circuit, which utilizes a power line carrier signal such as generated by the CCS product line manufactured by Leviton Manufacturing, Little Neck, N.Y. Using well known power line carrier techniques the arc detector can communicate with other devices such as a monitoring station. Each arc detector would have a unique address. A relationship is then established between the address assigned to the arc detector and its location. When an arc fault is detected, a signal is sent over the power lines to a monitoring station which alerts personnel of not only the occurrence of the arc fault but also its location. This is helpful especially if the AFCI/GFCI device is installed in a remote location. This feature has applicability in industrial and commercial locations where central arc fault supervision over a complex AC electrical wiring system is needed. One skilled in the electrical arts will appreciate that other types of communications such as those mentioned above can be used in place of the CCS communication system.

Today, AC power lines are not only used for supplying AC line current but they are also used as a media for communications as in Leviton Manufacturing's CCS line of power line carrier devices, CEBus compatible devices, LonWorks compatible devices, power line carrier based intercoms, TV signal transmission/reception equipment, telephone communication devices, etc. The arc detector of the present invention incorporates a filter circuit which permits the detection of arc faults while communications over the AC power lines is occurring. The filter circuit functions to remove frequencies below 500 KHz. On the other end of the frequency spectrum, although arcing generates frequencies into the GHz range, for simplicity, efficiency and reduced cost the arc detector of the present invention limits detection of high frequency signals to approximately 20 MHz.

BRIEF DESCRIPTION OF THE DRAWINGS

The invention is herein described, by way of example only, with reference to the accompanying drawings, wherein.

DETAILED DESCRIPTION OF THE INVENTION

Ground Fault Circuit Interrupters (GFCIs) are well known electrical devices in common use today. They are used to help protect against electrical shock due to ground faults. A GFCI is basically a differential current detector operative to trip a contact mechanism when 5 mA or more of unbalanced current is detected between the phase (hot or Ø) wire and the neutral (N) wire of an AC electrical power line. The unbalanced current detected is assumed to be flowing through a human accidentally touching the phase wire. The current flows through the human to ground rather than returning through the differential transformer via the neutral wire, thus creating the current imbalance described above. It should be noted that, not only current through a human, but also an appliance with inherent leakage to ground of 5 mA or more, would also trip the GFCI and disconnect the current to the load.

Figure 1:
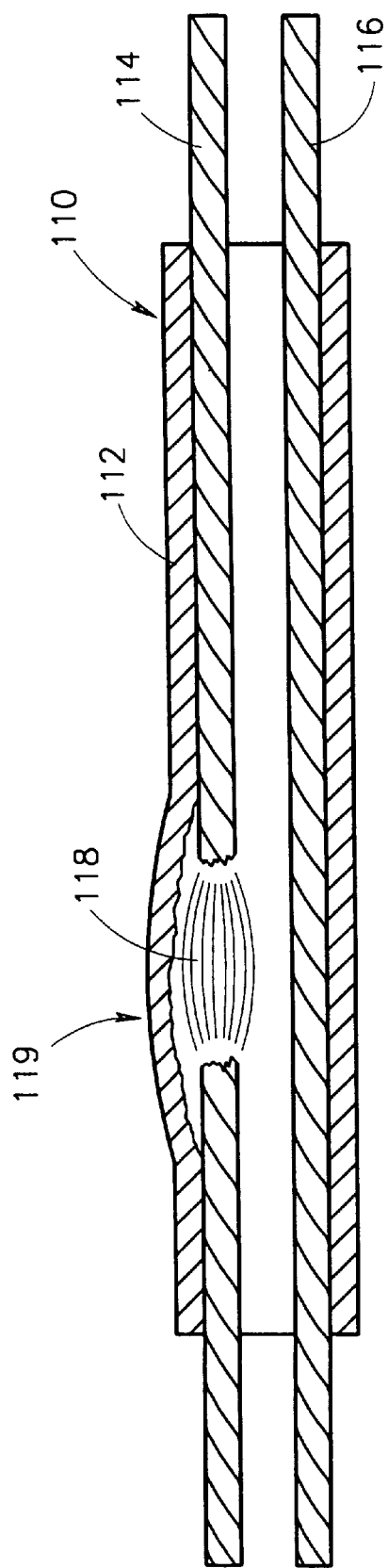
FIG. 1 is a schematic diagram illustrating an example of contact arcing in a current carrying conductor.
Figure 2:
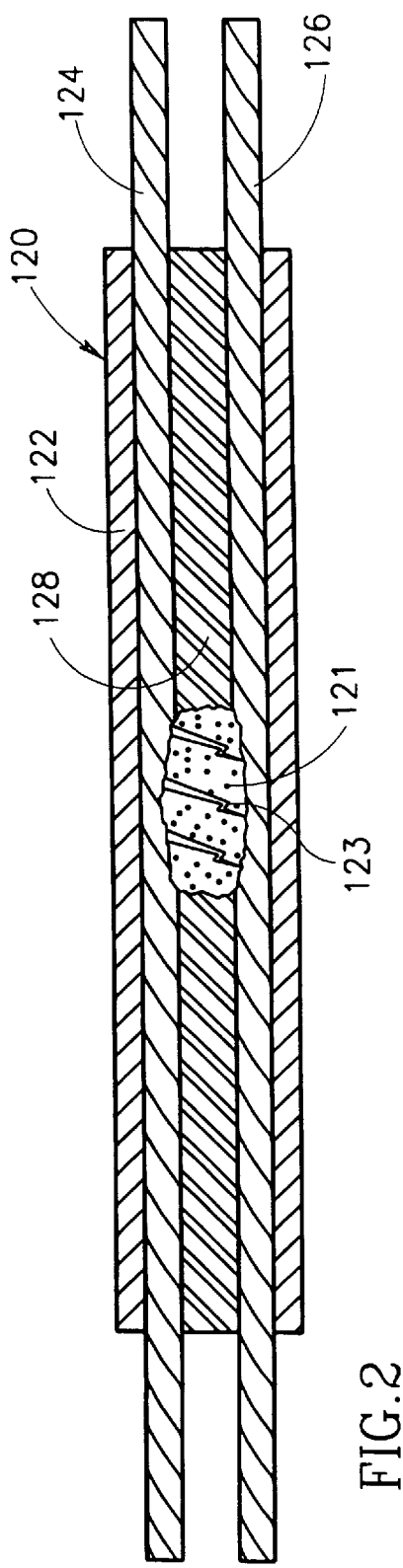
FIG. 2 is a schematic diagram illustrating an example of line arcing between two current carrying conductors.
Figure 3:
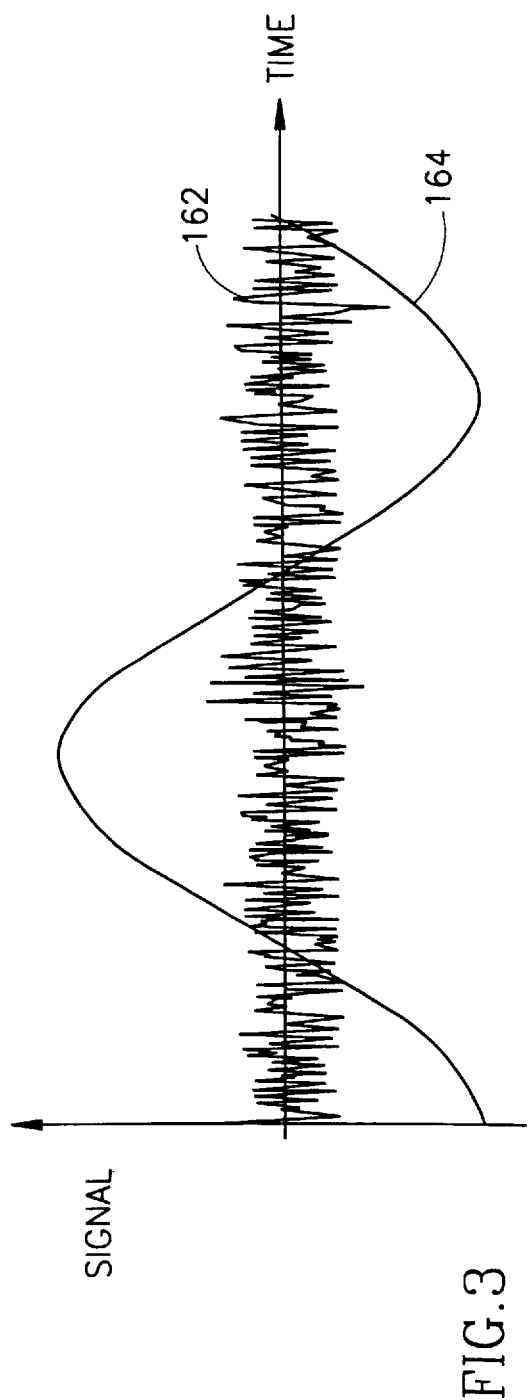
FIG. 3 is a graph illustrating the wide spectrum noise due to the EMF voltage generated by an arc propagating over the power line superimposed over the AC line voltage.
Figure 4:
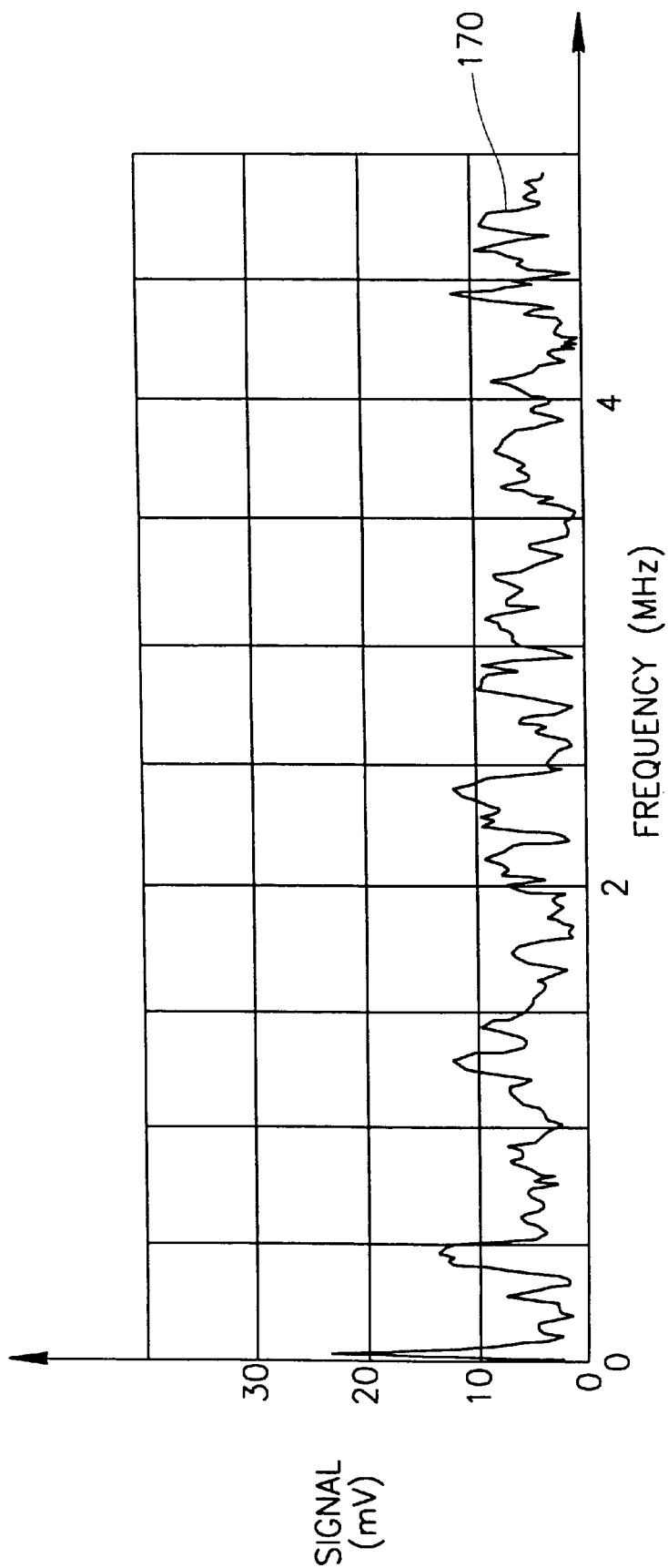
FIG. 4 is a graph illustrating frequency spectrum analysis of the waveform shown in FIG. 3.
Figure 5:
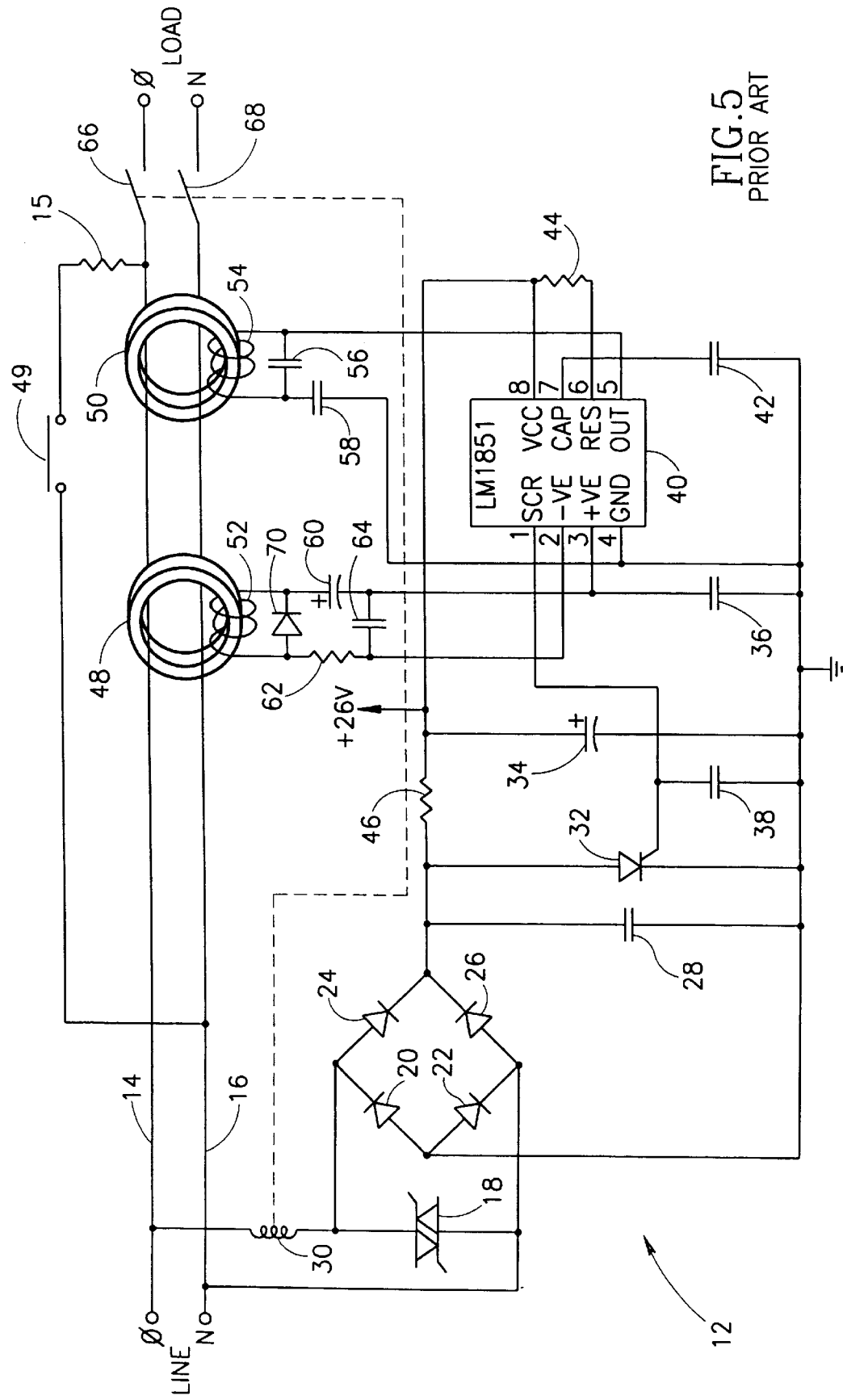
FIG. 5 is a schematic diagram illustrating an example of a prior art ground fault circuit interrupter device.

A schematic diagram illustrating an example of a prior art ground fault circuit interrupter device is shown in FIG. 5. The typical prior art GFCI, generally referenced 12, comprises two current transformers consisting of magnetic cores 48, 50 and coils 52, 54, respectively, coupled to integrated circuit 40 which may comprise the LM 1851 manufactured by National Semiconductor. A relay coil 30 is placed between the phase and one input to a full wave bridge rectifier. The AC power from the phase 14 and neutral 16 conductors is full wave rectified via a full wave rectifier comprising diodes 20, 22, 24, 26. A metal oxide varistor (MOV) 18 is placed across phase and neutral for protection. The output of the bridge is coupled across capacitor 28 and silicon controlled rectifier (SCR) 32. The gate of the SCR is coupled to ground via capacitor 38 and to pin 1 of IC 40.

A diode 70 is placed across the coil 52 which is coupled to pins 2 and 3 via resistor 62 and capacitors 64, 60. Pin 3 is also coupled to ground via capacitor 36. Coil 54 is coupled to pins 4 and 5 of IC 40 via capacitors 58, 56. Pin 4 is also coupled to ground. Pin 6 of IC 40 is coupled to pin 8 via resistor 44 and pin 7 is coupled to ground via capacitor 42. Pin 8 is also coupled to capacitor 34 and to resistor 46. The voltage on pin 8 serves as the 26 V supply voltage for the GFCI circuitry.

Line side electrical conductors, phase 14 and neutral 16, pass through the transformers to the load side phase and neutral conductors. A relay, consisting of switches 66, 68, associated with the phase and neutral conductors, respectively, function to open the circuit in the event a ground fault is detected. The switches 66, 68 are part of a double throw relay which includes coil 30. The coil 30 in the relay is energized when the GFCI circuitry turns on the silicon controlled rectifier (SCR) 32. In addition, the GFCI 12 comprises a test circuit comprised of momentary push button switch 49 connected in series with a resistor 15. When the switch 49 is pressed, a temporary simulated ground fault, i.e., a temporary differential current path, from phase to neutral is created in order to test the operation of the GFCI 12.

Figure 6:
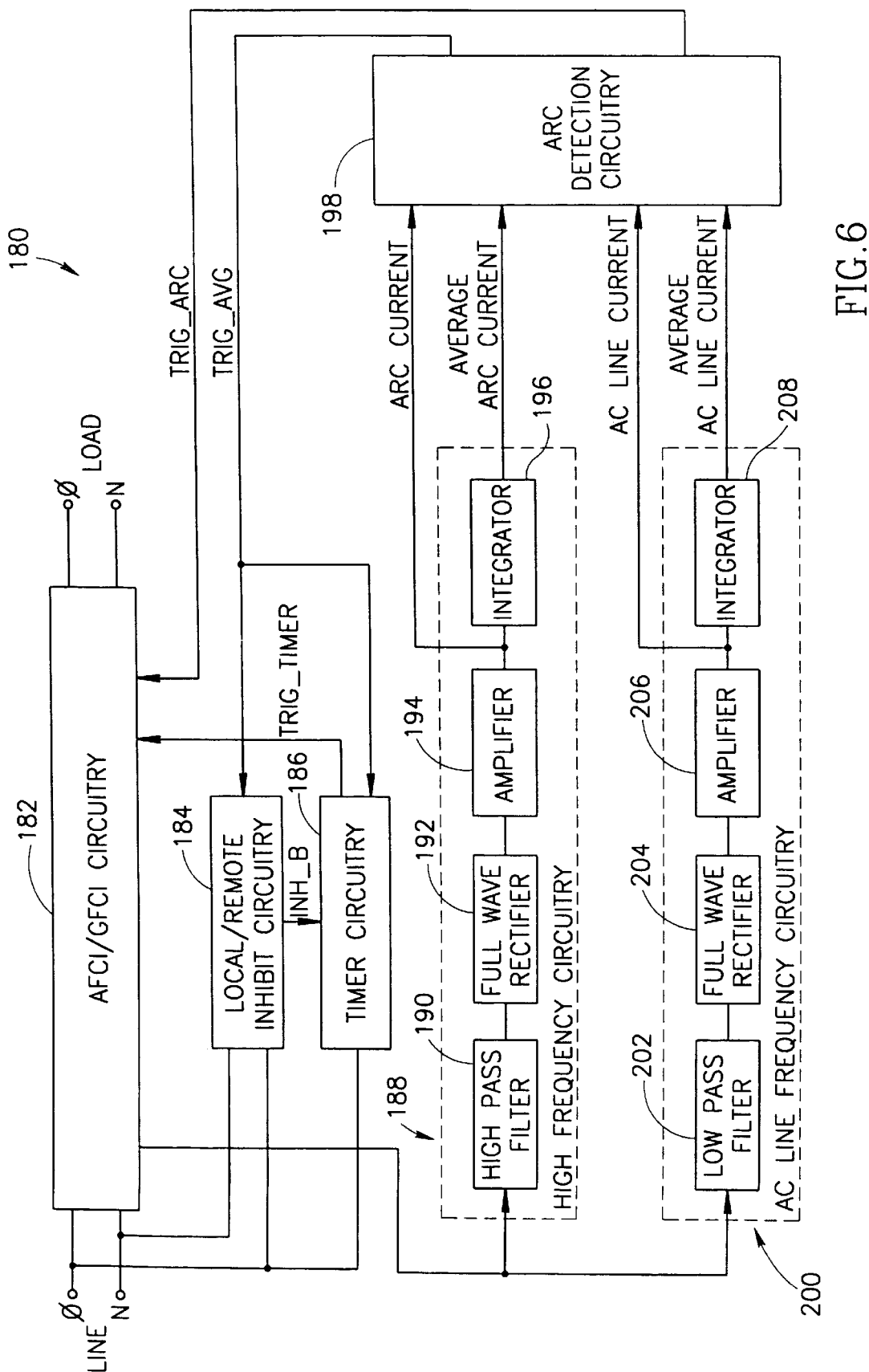
FIG. 6 is a high level block diagram illustrating the combination arc fault detector and ground fault circuit interrupter device of the present invention.

A high level block diagram illustrating the arc fault/circuit interrupter device of the present invention is shown in FIG. 6. For illustrative purposes only, the description that follows is within the context of a combination arc fault circuit interrupter/ground fault circuit interrupter (AFCI/GFCI) device. It would be clear to one skilled in the art, however, that other types of circuit interrupting devices such as IDCIs or ALCIs can be combined with the arc fault detector in similar fashion.

The AFCI/GFCI device, generally referenced 180 and hereinafter referred to as the device, comprises AFCI/GFCI circuitry 182, AC line frequency circuitry 200, high frequency circuitry 188, arc detection circuitry 198, local/remote inhibit circuitry 184 and timer circuitry 186. The AFCI/GFCI circuitry 182 generally comprises a standard GFCI device in addition to several components that are shared between the AFCI and the GFCI portions of the device. The device is a four terminal device comprising line side phase and neutral leads as well as load side phase and neutral leads. Normally, the device is coupled to an electrical wiring system or network with the line side phase and neutral terminals electrically connected to a source of AC power. The load side phase and neutral terminals are connected to electrical devices located downstream from the device.

Figure 7:
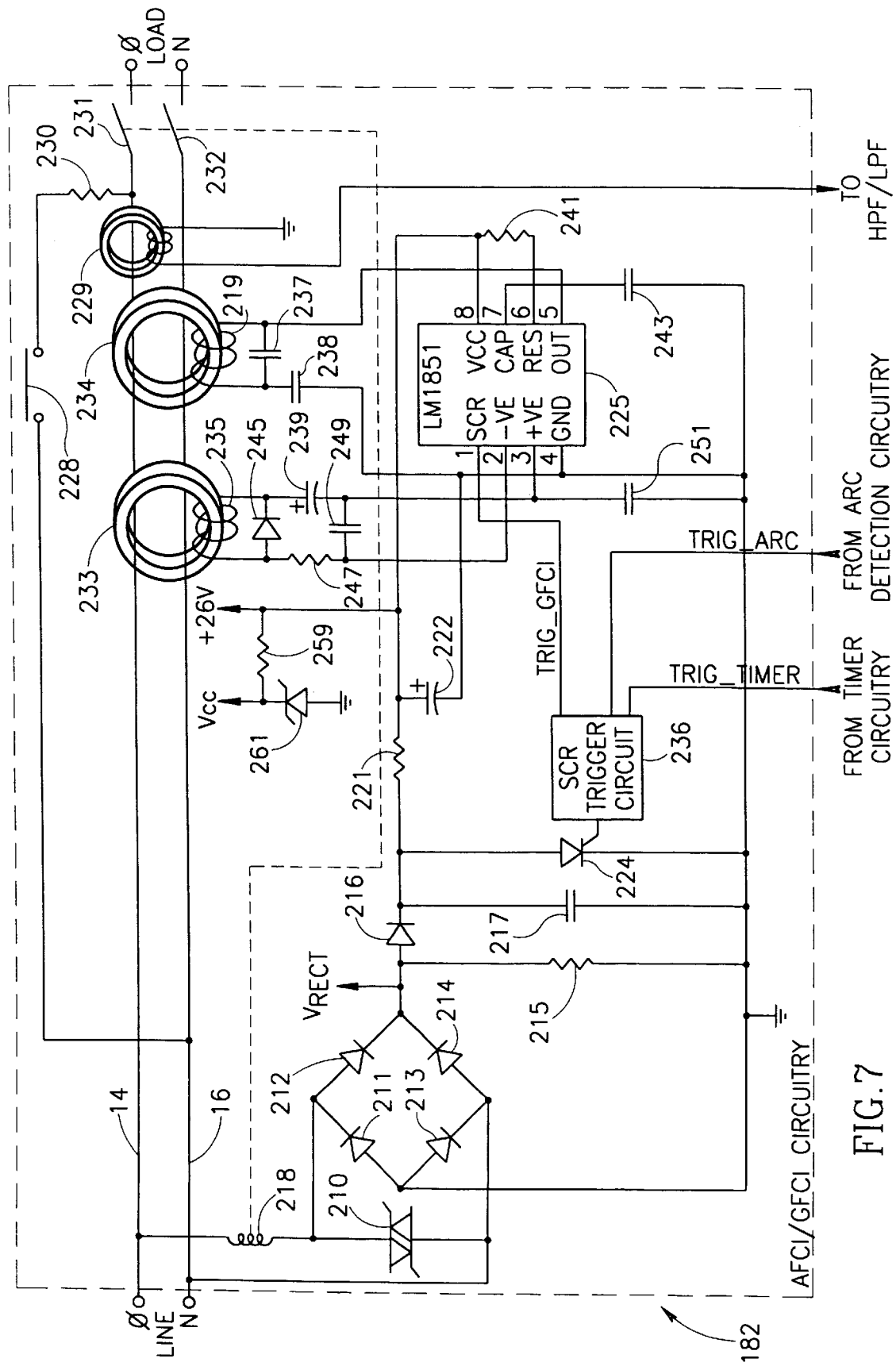
FIG. 7 is a schematic diagram illustrating the AFCI/GFCI circuitry portion of the arc fault detection device of the present invention more detail.

Each of the components of the device 180 is described in more detail hereinbelow, beginning with the AFCI/GFCI circuitry. A schematic diagram, illustrating the AFCI/GFCI circuitry portion of the arc fault detection device of the present invention in more detail, is shown in FIG. 7. The GFCI portion of the device is described briefly below. A more detailed description of a GFCI circuit can be found in U.S. Pat. No. 5,202,662, issued to Bienwald et al.

A GFCI is an electrical device that functions to detect hazardous grounding conditions in consumer and industrial environments. Unbalanced current through the differential transformer 233 is sensed by the circuitry. If the current imbalance is above a specified threshold, which has been determined to be dangerous to personnel or machinery, the integrated circuit (IC) 225 triggers SCR 224. The SCR 224, in turn, activates the coil 218 of a relay circuit breaker comprising phase contacts 231 and neutral contacts 232 thus disconnecting the source of electrical power from the load. When the GFCI circuitry detects the existence of a ground fault, the signal line TRIG_GFCI is made active. In this way the circuit protects users from harmful or lethal electric shocks. The SCR trigger circuit 236 has three trigger inputs, TRIG_GFCI, TRIG_TIMER and TRIG_ARC. Normally the three trigger signals are in an inactive state. However, any or all of the three trigger inputs going active will cause the SCR trigger circuit generate a switching signal to turn the SCR 224 on.

A second differential transformer 234 within the AFCI/GFCI circuitry is provided to detect a low impedance condition between the load side neutral wire and ground. A low impedance neutral/ground connection allows ground fault current to leak back from the ground to the neutral wire passing through the differential transformers. This reduces the sensitivity of the GFCI and potentially permits lethal ground faults to occur without the GFCI tripping. If the impedance of the neutral/ground connection becomes too low, the IC 225 triggers the SCR 224 via the TRIG_GFCI signal, thus disconnecting both phase and neutral from the load.

As described previously, the ground/neutral transformer 234 is utilized to detect ground to neutral faults and is specifically designed for that purpose. In the present invention this transformer is utilized to perform two functions simultaneously. For detecting ground faults, this transformer is used in a differential mode. The sum of the currents, in the two wires passing through its center, is zero in the absence of a ground fault or ground/neutral fault.

In particular, the AFCI/GFCI circuit, generally referenced 182, comprises two current transformers consisting of magnetic cores 233, 234 and coils 235, 219, respectively, coupled to integrated circuit 225 which may comprise the LM 1851 manufactured by National Semiconductor or the RA9031 manufactured by Raytheon. The AC power from the phase 14 and neutral 16 conductors is full wave rectified via a full wave rectifier comprising diodes 211, 212, 213, 214. A metal oxide varistor (MOV) 210 is placed across phase and neutral for protection. The voltage output of the bridge, represented as $V_{RECT}$ is coupled across resistor 215 and in serial with diode 216. The cathode of the diode is coupled to a capacitor 217 and to SCR 224. The gate of the SCR is coupled to the output of an SCR trigger circuit 236. The output of pin 1 of IC 225 forms one of the inputs to the SCR trigger circuit 236.

A diode 245 is placed across the coil 235 which is coupled to pins 2 and 3 via resistor 247 and capacitors 239, 249. Pin 3 is also coupled to ground via capacitor 251. Coil 219 is coupled to pins 4 and 5 of IC 225 via capacitors 237, 238. Pin 4 is also coupled to ground. Pin 6 of IC 225 is coupled to pin 8 via resistor 241 and pin 7 is coupled to ground via capacitor 243. Pin 8 is also coupled to capacitor 222 and to resistor 221. The voltage on pin 8 serves as the 26 V supply voltage for the GFCI circuitry. The 26 V is coupled to a resistor 259 and a zener diode 261 which functions to generate a lower $V_{CC}$ supply voltage for use by internal circuitry of the AFCI/GFCI.

Line side electrical conductors, phase 14 and neutral 16, pass through the transformers to the load side phase and neutral conductors. A relay, consisting of switches 231, 232 associated with the phase and neutral conductors, respectively, function to open the circuit in the event a ground fault is detected. The switches 231, 232 are part of a double throw relay which includes coil 218. The coil 218 in the relay is energized when the AFCI/GFCI circuitry turns on the SCR 224. In addition, the circuit comprises a test button comprised of momentary push button switch 228 connected in series with a resister 230. When the switch 228 is pressed, a temporary ground fault from phase to neutral is created in order to test the operation of the device.

It is believed that one novel feature of the present invention is the incorporation of circuitry necessary for detecting arc faults into a circuit interrupting device such as a GFCI. The remainder of this document describes the arc detection (AFCI) circuitry in more detail. The AFCI and GFCI circuit portions operate independently from one another but share several components. With reference to FIG. 7, both circuits are powered from the line side of the AC power source through the same power supply. Resistor 259 and zener diode 261 are required in order to step the GFCI circuitry voltage down to a level that is usable by the rest of the circuitry. The $V_{CC}$ output voltage is provided to both AFCI and GFCI circuit portions. Both AFCI and GFCI circuits operate to interrupt the AC power by opening two sets of contacts 231, 232 via the actuation of a relay coil 218. The relay coil is actuated by triggering the SCR 224 via the SCR trigger circuit 236. Although either the AFCI or GFCI circuits can trigger the SCR 224, their triggering signals are isolated from one another. The SCR trigger circuit functions to provide an OR type logic operation to trigger the SCR 224 using well known thyristor triggering techniques when either of its three input triggers TRIG_GFCI, TRIG_TIMER or TRIG_ARC go active.

The AFCI/GFCI circuitry also comprises a toroidal current to voltage transformer 229 which can be positioned on either the phase or neutral line of the AC power source. In FIG. 7, the transformer is shown with the phase line passing through it. Alternatively, the neutral conductor can pass through it. The turns ratio of the transformer 229 is calculated so as to generate a primary current to secondary voltage ratio of approximately 10 A to 1 V peak. The transformer 229 is preferably constructed from ferrite material that is capable of detecting a wide band of frequencies which ranges from a few Hz to MHz. A wideband transformer 229 is necessary in order to provide the AFCI detection circuitry with the low and high frequencies that are needed for the device to detect arc faults.

Figure 8:
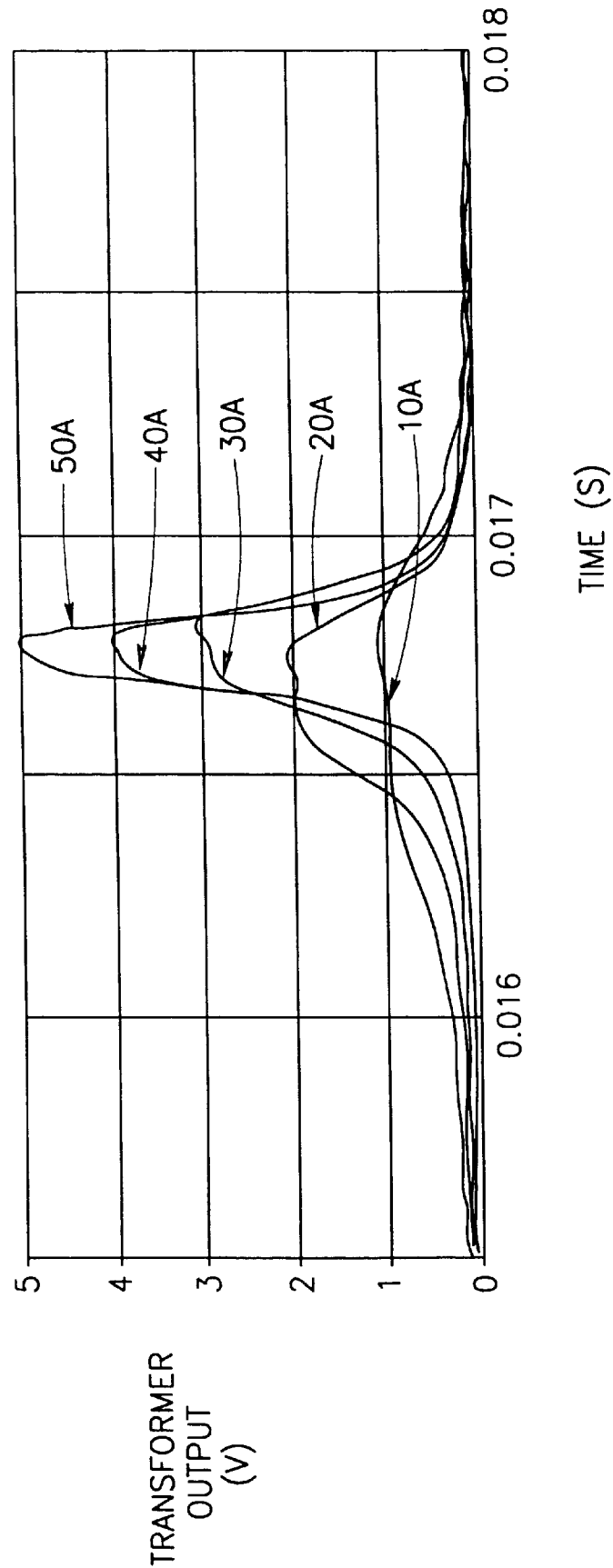
FIG. 8 is a graph illustrating the transformer output voltage versus time for varying amounts of current.
Figure 9:
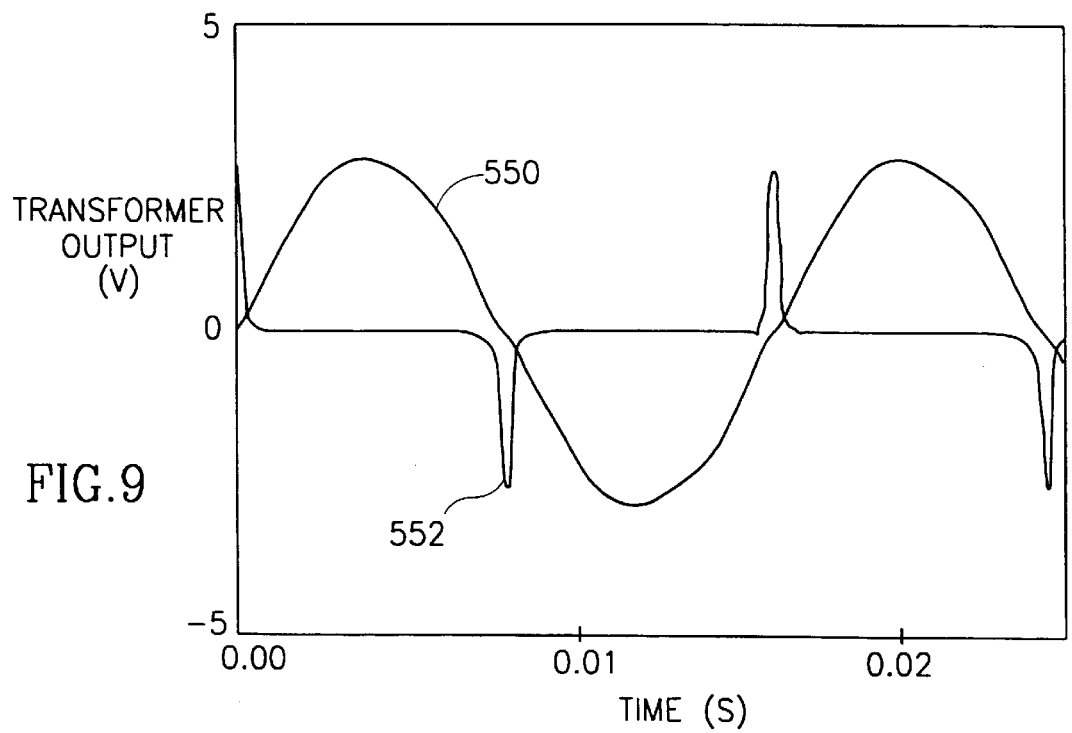
FIG. 9 is a graph illustrating the transformer output voltage versus time for a 28 A of current with the AC line voltage superimposed over it.
Figure 10:
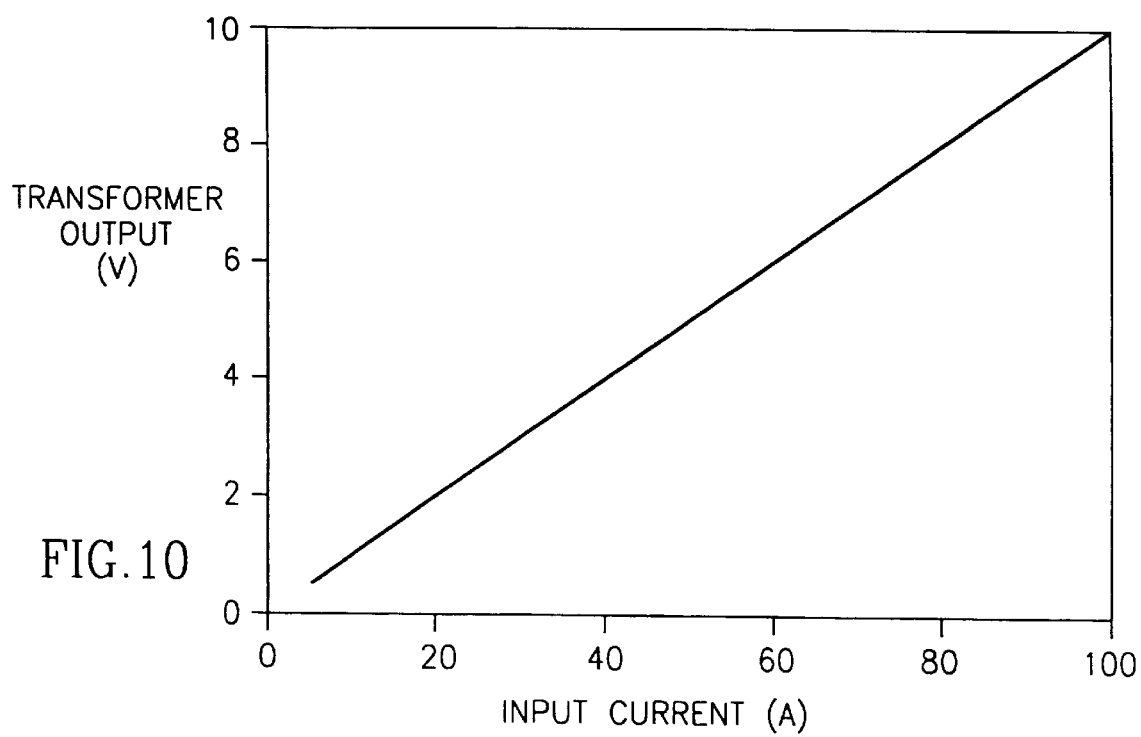
FIG. 10 is a graph illustrating the substantially linear relationship between the transformer output voltage and the input current.

Tests performed by the inventors have shown that at high currents, i.e., greater than 1 A, the transformer 229 generates a peak output voltage that is nearly linearly proportional to the peak current flowing through it. The relationship of input current to transformer output voltage is illustrated in FIGS. 8, 9 and 10. FIG. 8 is a graph illustrating the transformer output voltage versus time for varying amounts of current. FIG. 9 is a graph illustrating the transformer output voltage versus time for a 28 A of current with the AC line voltage superimposed over it. FIG. 10 is a graph illustrating the substantially linear relationship between the transformer output voltage and the input current.

This relationship of input current to transformer voltage output holds true whether the load is resistive, capacitive, inductive or a combination of all three. Thus, the type of load connected to the device does not effect arc detection in any way.

With reference to FIG. 6, the output of the transformer 229 is input to two separate circuits. One circuit being the high frequency (HF) circuit 188 comprising a high pass filter 190, full wave rectifier 192, amplifier 194 and integrator 196. The second circuit being the AC line frequency circuit 200 comprising low pass filter 202, full wave rectifier 204, amplifier 206 and integrator 208. The splitting of the output signal from the transformer 229 into two signals of different frequencies permits the device to react to different combinations of AC line frequency and high frequency arcing signals. This permits the AFCI circuit to react appropriately to many different arcing and over current situations.

Figure 11:
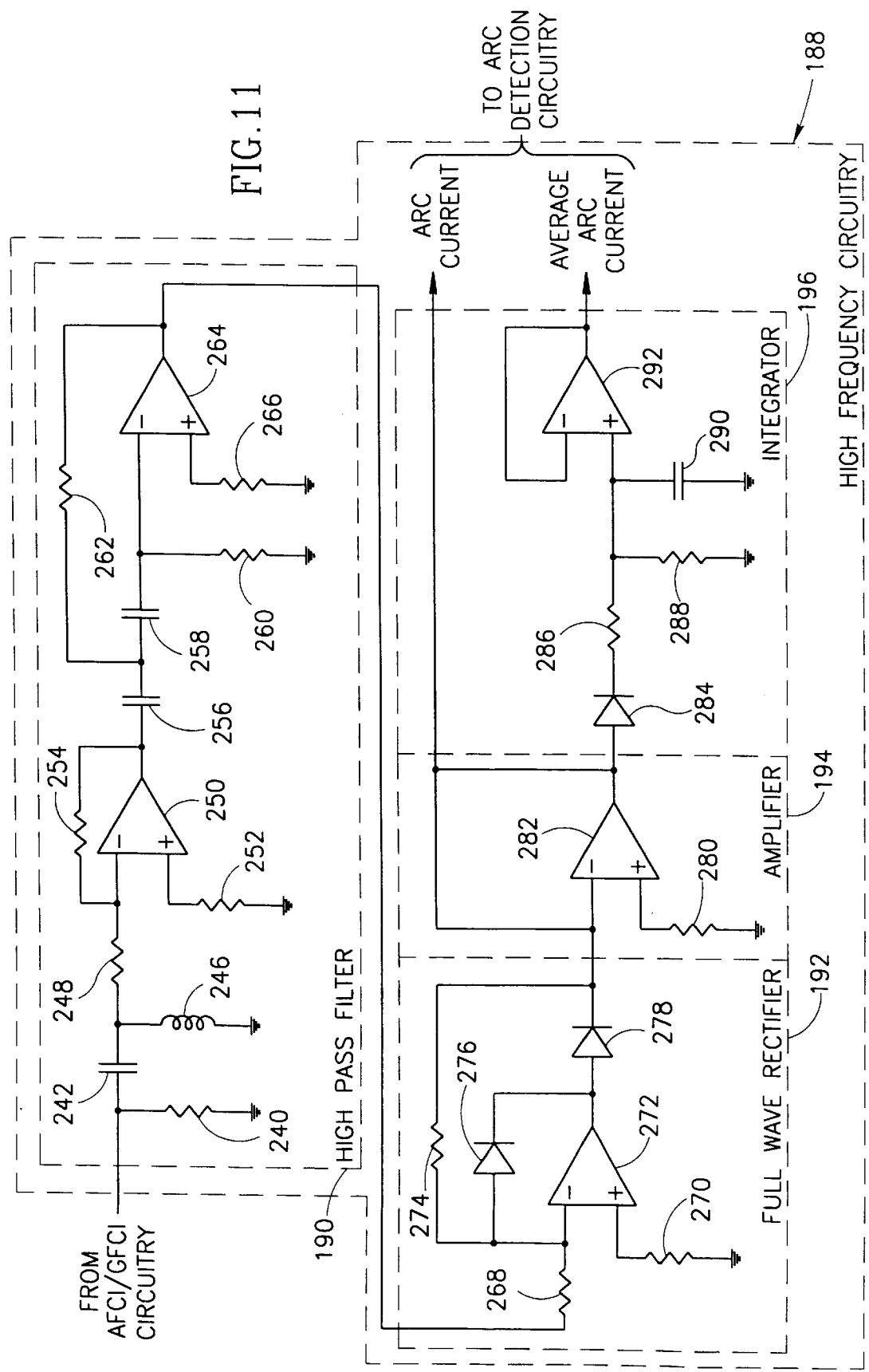
FIG. 11 is a schematic diagram illustrating the high frequency circuitry portion of the arc fault detection device of the present invention in more detail.

A schematic diagram illustrating the high frequency circuitry portion of the arc fault detection device of the present invention in more detail is shown in FIG. 11. The high pass filter 190 comprises a passive (LC network) high pass filter, an amplifier and an active op amp based high pass filter in series. The capacitor 242 is chosen so as to have negligible impedance for frequencies above approximately 500 KHz, while the inductor 246 is chosen so as to be an open circuit above 500 KHz. Thus, high frequencies pass through the filter. At low input frequencies, capacitor 242 has a high impedance and inductor 246 appears as a virtual short to ground, thus severely attenuating low frequency signals. The resistor 240 helps to prevent the LC network consisting of capacitor 242 and inductor 246 from resonating by dampening oscillations. Thus the LC network functions as a high pass filter whose output is input to operational amplifier 250.

The gain of the op amp 250, defined by resistors 248 and 254, is set to provide a suitable functional range of high frequency arcing signals for later signal processing operations. The resistor 252 provides temperature compensation, permitting the detector to operate at temperatures higher than room temperature without any loss of accuracy. The op amp 250 also functions as a buffer, producing a low impedance source for the series connected filter constructed around op amp 264.

This filter comprises a two pole, active high pass Chebychev filter with a cut off frequency of approximately 500 KHz. This filter provides high attenuation of signals below 500 KHz, thus preventing power line carrier communication signals present on the AC line (which might reach frequencies as high as 400 KHz) from interfering with the detection of arc faults. The filter is constructed from capacitors 256, 258, resistors 262, 260 and op amp 264. The resistor 266 is utilized for temperature compensation.

The output of the Chebychev filter is input to a full wave rectifier 192 which is capable of rectification at input voltages in the millivolt range. The rectifier 192 comprises an op amp 272 whereby the positive input of the op amp is held to ground via resistor 270. The diodes 276, 278 provide rectification of the signal. Due to the feedback via resistor 274, no loss in signal is achieved. Resistors 268, 274 define the gain of the rectification stage 192.

The pulsating high frequency DC signal output by the full wave rectifier 192 is input to an amplifier 194 comprising op amp 282 and resistor 280. The amplifier 194 functions as a voltage follower or impedance matching buffer providing a low resistance source for the arc current signal which is representative of the peak level of arc current on the AC line. The arc current signal is the voltage of the high frequency processed signal, containing all the peaks and troughs of the original signal. If this voltage is excessively high, the device will trip the relay.

The output of the amplifier 194 is input to the integrator 196 which functions to generate a signal representative of the level of the average peak arc current present on the AC line. The integrator preferably has an integration time of approximately 100 ms. The buffered signal output from the full wave rectifier 192 is smoothed and averaged via diode 284, resistors 288, 286 and capacitor 290. Resistor 286 and capacitor 290 are sufficiently large to smooth out the rapid fluctuations of the high frequency arcing signal and convert them to a slower moving DC level suitable for the arc detection circuit 198 (FIG. 6). The resulting averaged arc current signal is output via the voltage follower/buffer 292.

Figure 12:
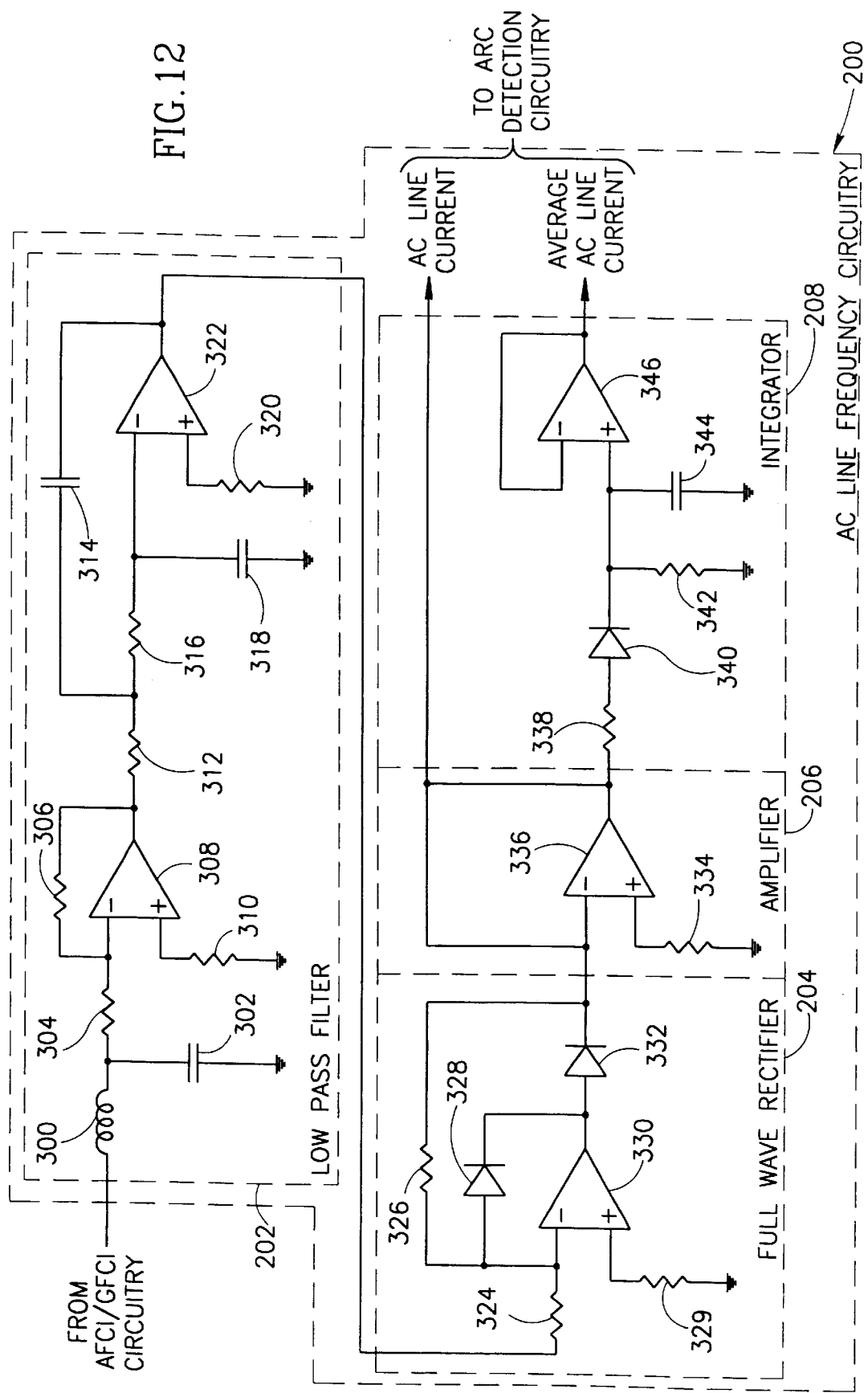
FIG. 12 is a schematic diagram illustrating the AC line frequency circuitry portion of the arc fault detection device of the present invention in more detail.

A schematic diagram illustrating the AC line frequency circuitry portion of the arc fault detection device of the present invention in more detail is shown in FIG. 12. In contrast to the high frequency circuitry 188 of FIG. 6, the AC line frequency circuitry 200 of FIG. 12 performs low pass filtering. The input LC network of the low pass filter 202 comprising capacitor 302 and inductor 300 functions as a low pass filter. Frequencies less than 500 Hz are passed with negligible attenuation. At these frequencies, inductor 300 is virtually a short circuit and capacitor 302 has high impedance. At frequencies above 500 Hz, the inductor 300 is high impedance and the capacitor 302 has low impedance thus severely attenuating any high frequency content in the input signal. The resistor 240 (FIG. 11) also prevents this second LC network from resonating as well.

The output of the LC network is input to an amplifier constructed from op amp 308 and resistors 304, 306, 310. The gain of the op amp 308, defined by resistors 304, 306, is set so that the AC line frequency circuitry 200 provides 1 V per 10 A flowing on the AC power line. This precise current to voltage relationship permits the circuitry to accurately detect and reject the low level arcing produced by common appliances connected to the AFCI/GFCI device. The resistor 310 provides temperature compensation in a similar manner to the resistor 252 (FIG. 11). The op amp circuit 308 also functions as a buffer producing a low impedance output source for the filter constructed around op amp 322.

The filter coupled in series with op amp circuit 308 is a two pole, active low pass Chebychev filter with a cut off frequency of approximately 500 Hz. The use of an active filter provides a much sharper cut off of high frequencies. The low pass filter is constructed from the resistors 312, 316, 320, capacitors 314, 318 and op amp 322.

The output of the Chebychev filter is input to a full wave rectifier 204 which is capable of rectification at input voltages in the millivolt range. The rectifier 204 comprises an op amp 330 whereby the positive input of the op amp is held to ground via resistor 329. The diodes 328, 332 provide rectification of the signal. Due to the feedback via resistor 326 no loss in signal is achieved. Resistors 324, 326 define the gain of the rectification stage 204.

The pulsating low frequency DC signal output by the full wave rectifier 204 is input to an amplifier 206 comprising op amp 336 and resistor 334. The amplifier 206 functions as a voltage follower or impedance matching buffer providing a low resistance source for the AC line current signal which is representative of the peak level of AC line current on the electrical line that the AFCI/GFCI device is monitoring. The AC line current signal is the voltage of the low frequency processed signal, containing all the peaks and troughs of the original signal. If this voltage is excessively high, the device will trip the relay.

The output of the amplifier 206 is input to the integrator 208 which functions to generate a signal representative of the level of the average peak AC line current. The integrator preferably has an integration time of approximately 100 ms. The buffered signal output from the full wave rectifier 204 is smoothed and averaged via diode 340, resistors 338, 342 and capacitor 344. Resistor 338 and capacitor 344 are sufficiently large to smooth out the fluctuations of the AC line frequency signal and convert them to a slower moving DC level suitable for the arc detection circuit 198 (FIG. 6). The capacitor 344 is slowly discharged by resistor 342. The resulting averaged AC line current signal is output via the voltage follower/buffer 346.

The resistors and capacitors in the averaging circuit 208 are preferably chosen to attenuate the signals generated by the inrush currents of typical household appliances which contain, for example, electric motors, incandescent lamps and switching power supplies. The inrush currents generated by these appliances produce a short duration voltage spike which decays very quickly after the appliance is turned on.

Thus, the AC line frequency circuitry 200 outputs two signals, the first signal being proportional to the peak AC line current flowing in the power line and the second signal being proportional to the average AC line current flowing in the power line. The high frequency circuitry 188 also outputs two signals, the first signal being proportional to the peak current of frequency components above 500 KHz (with the highest frequency limited by the physical characteristics of the components and op amps utilized) and the second signal being proportional to the average current of frequency components above 500 KHz. All four of these signals are utilized by the arc detection circuit 198 (FIG. 6) to permit the AFCI/GFCI device to react appropriately to a wide range of dangerous conditions. Use of the four signals also permits the device to disregard both inrush currents and noise typically generated by household appliances, while reliably detecting dangerous arcing conditions.

Alternatively, it may be possible to remove either the initial passive LC type filtering or the active filtering (op amps) and still provide sufficient filtering of the AC line frequency signal and any high frequency arcing signals for the device to work as intended. Ensuring the attenuation of any signals in the frequency bands used for power line carrier communications would also be a consideration.

Figure 13A:
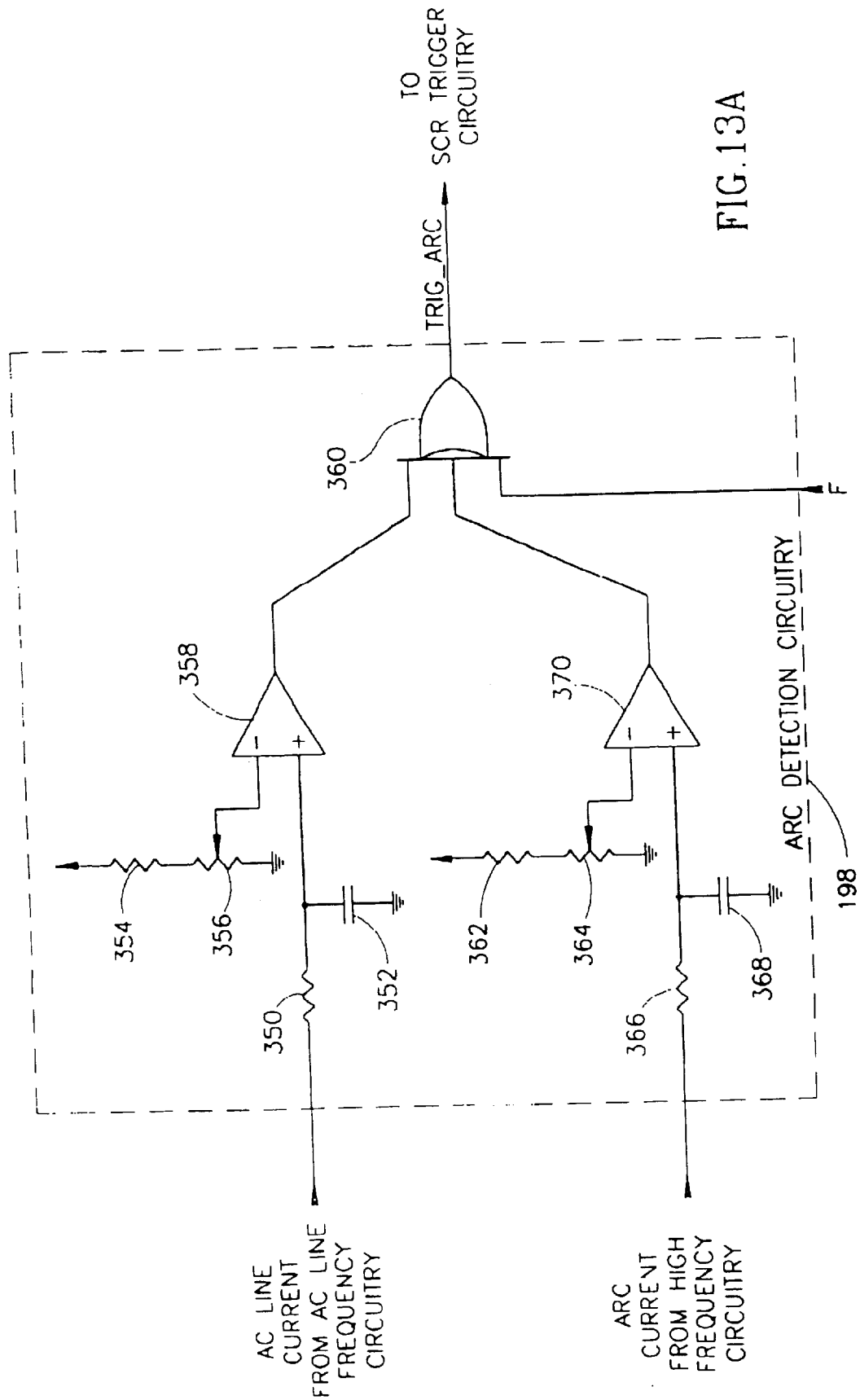
FIGS. 13A, 13B and 13C are schematic diagrams illustrating the arc detection circuitry portion of the arc fault detection device of the present invention in more detail.
Figure 13B:
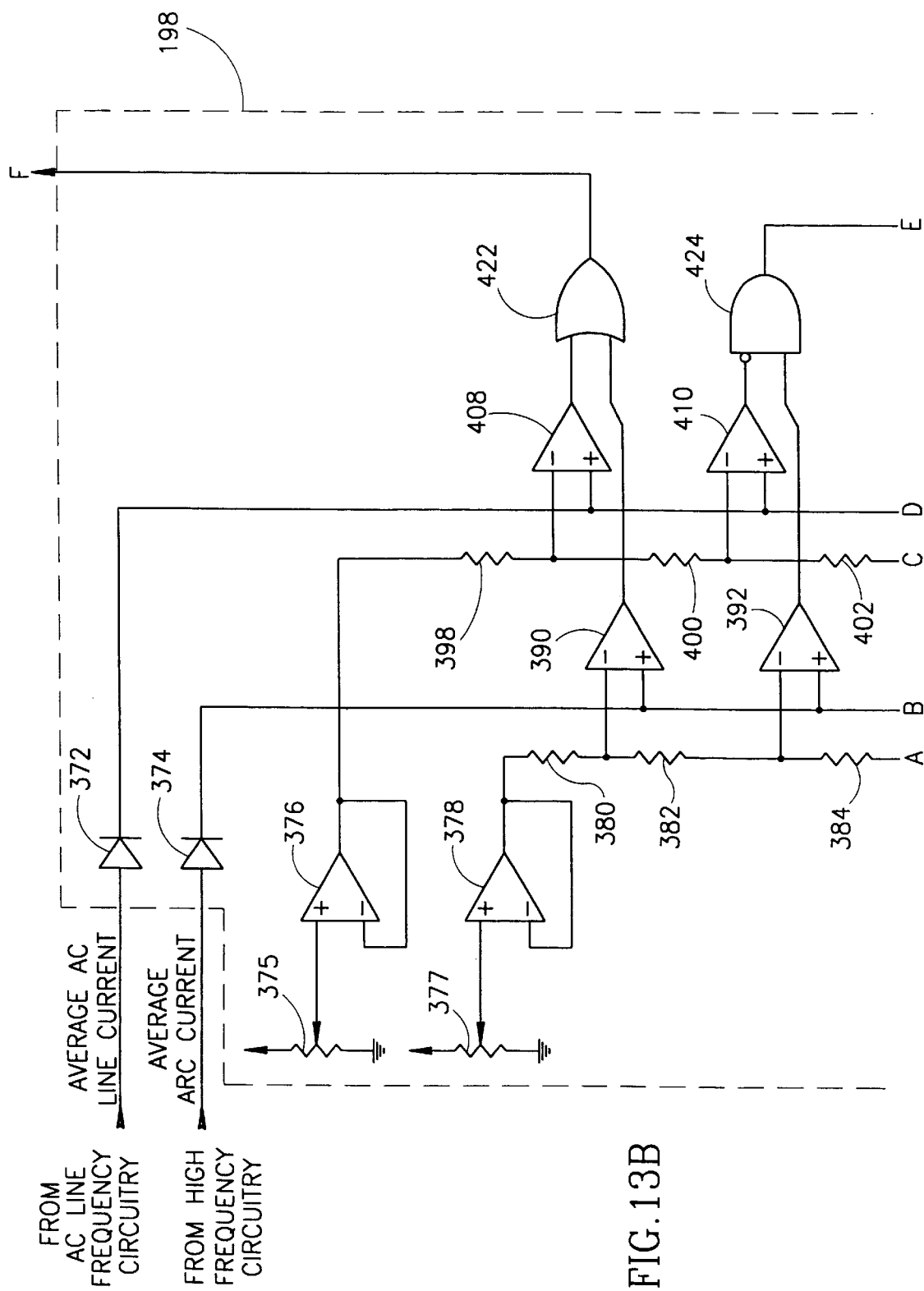
Figure 13C:
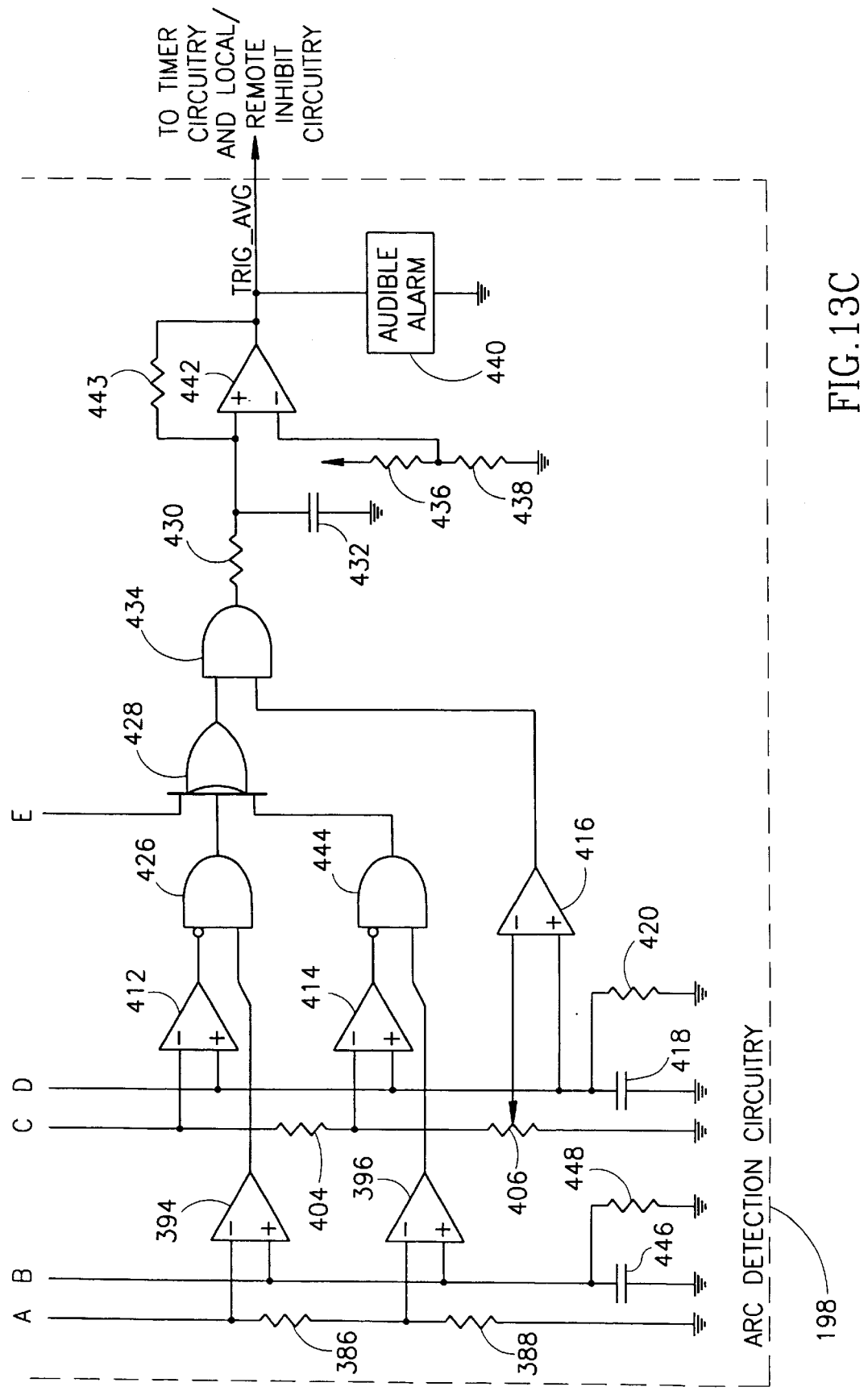

Schematic diagrams illustrating the arc detection circuitry portion of the arc fault detection device of the present invention in more detail are shown in FIGS. 13A, 13B and 13C. The arc detection circuitry functions to generate two trigger signals termed TRIG_ARC and TRIG_AVG. The generation of the first signal TRIG__ARC will be described first. With reference to FIG. 13A, the arc detection circuitry is operative to detect when the peak AC line frequency current or the peak high frequency arc current is above a predetermined threshold that has been determined to be unsafe. The peak AC line frequency current from the AC line frequency circuitry 200 (FIG. 12) is smoothed via resistor 350 and capacitor 352 before being input to comparator 358. The minus input of the comparator is the output of a voltage divider which serves as a reference voltage. Resistor 354 and pot 356 form the voltage divider. This reference voltage is set to a value representing the highest permissible peak AC line current on the AC line. Preferably, the highest permissible peak AC line current is 100 A. When the AC line frequency peak voltage is higher than the set threshold, the normally low output of the comparator 358 will go high. If the other inputs to the OR gate 360 were previously low then comparator 358 going high causes the signal TRIG__ARC to go high. This, in turn, causes the SCR trigger circuit 236 (FIG. 7) to trigger the SCR and open the relay, disconnecting the power to the load. This circuit is particularly useful for detecting short duration, hazardous arcing, where appreciable load current is flowing through the arc and the power line such as when an extension cord is cut by the sharp edge of a metal chair leg.

Similarly, the peak high frequency current from the high frequency circuitry 188 (FIG. 11) is smoothed via resistor 366 and capacitor 368 before being input to comparator 370. The minus input of the comparator is the output of a voltage divider which serves as a reference voltage. Resistor 362 and pot 364 form the voltage divider. This reference voltage is set to a value representing the highest permissible peak high frequency arc current on the AC line. When the high frequency peak voltage is higher than the set threshold, the normally low output of the comparator 370 will go high. If the other inputs to the OR gate 360 were previously low then comparator 370 going high causes the signal TRIG__ARC to go high. This, in turn, causes the SCR trigger circuit 236 (FIG. 7) to trigger the SCR and open the relay, disconnecting the power to the load. This circuit is particularly useful for detecting short duration, hazardous arcing, where appreciable load current is flowing through the arc and the power line such as when an extension cord is cut by the sharp edge of a metal chair leg.

Both the peak AC line frequency and peak high frequency comparator circuits are preferably constructed such that the relay in the AFCI/GFCI will trip within approximately three AC cycles, i.e., 40 ms, when 100 A of arcing and/or AC line over current conditions are detected. This level of detection and speed of tripping is termed Level 3 priority. The two other levels, Levels 2 and 1 are lower in priority and consequently more time is needed before the relay is tripped.

The quick response associated with Level 3 priority arcing and over current situations is achieved by using the peak voltages output from the AC line and high frequency circuits rather than the average voltages. This provides an instant tripping reaction to excessive inrush currents. In addition, it also provides extra margin for detecting very large arcs, as these have a large AC line frequency component and a sufficient amount of energy to start a fire quite rapidly.

The novel approach to arc detection utilized in this invention provides very fast response to a wide range of dangerous scenarios. The device utilizes the two comparators 358, 370 to quickly turn off the AC power to the load in the following three different situations: (1) when the line has high levels of arcing (2) when the peak AC line current exceeds the line's capacity and (3) when the line is overloaded due to excessive arcing.

Figure 14:
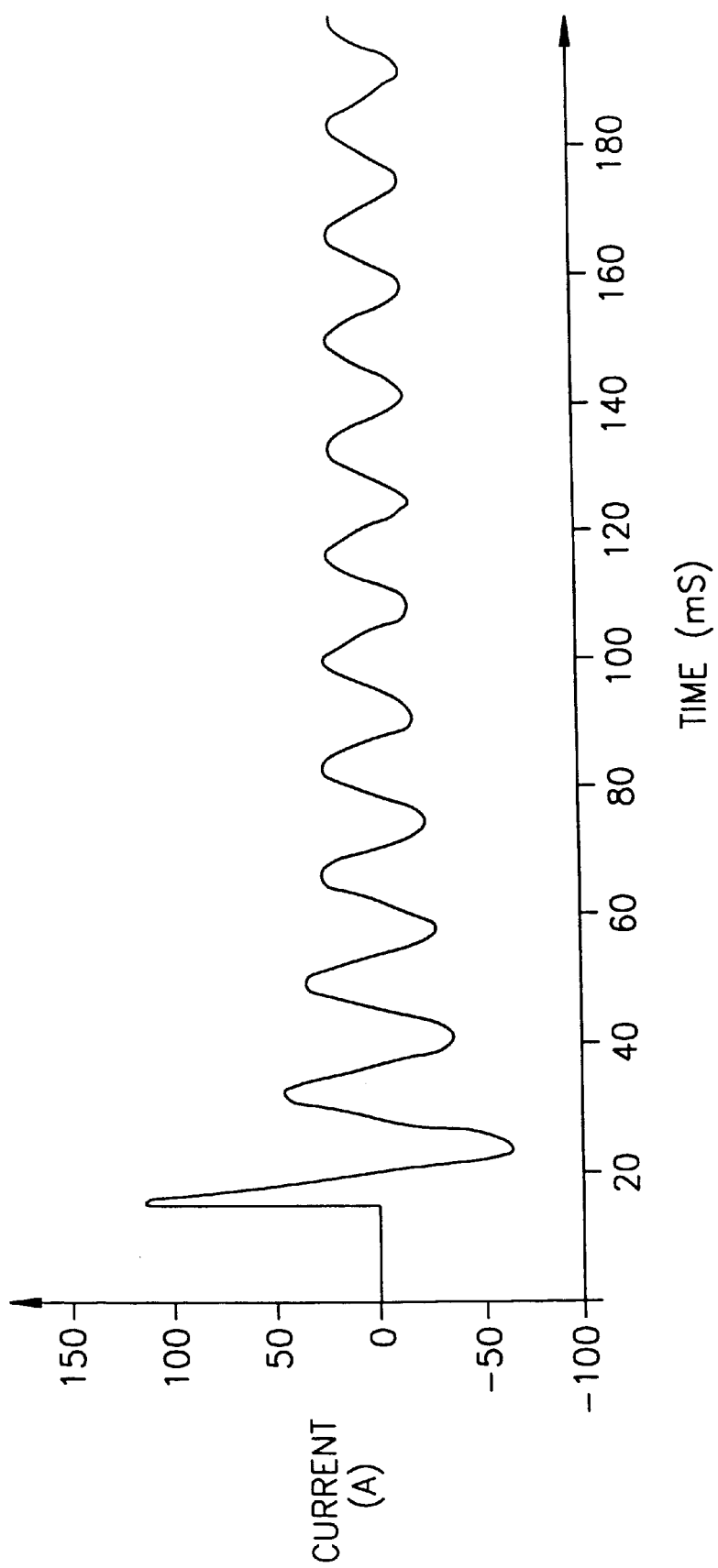
FIG. 14 is a graph illustrating the inrush current versus time for a 15 A incandescent load.

Normal inrush currents associated with motors and incandescent bulbs, for example, though short in duration, can be very high. A graph illustrating the magnitude of inrush current versus time for an incandescent lamp is shown in FIG. 14. A 15 A incandescent load was connected to the load side of the AFCI/GFCI and the inrush current was measured. A peak inrush current of approximately 130 A was measured. This peak inrush would normally generate sufficient voltage to trip the AFCI/GFCI. However, capacitors 352 and 368 (FIG. 13A) generate a time delay. The values of capacitors 352, 368 are chosen to provide a time delay of approximately 25 ms for the comparators 358, 370, respectively. As can be seen from the graph on FIG. 14, after approximately 5 ms the peak current has dropped to below 80 A. This time delay prevents false tripping by inrush currents, as comparators 358, 370 are configured to trip within 40 ms at 100 A load current.

The next lower priority level, Level 2, is associated with high average arcing, i.e., average AC line frequency current or average high frequency arc current greater than 1.5 times the rating of the AFCI/GFCI. At this priority level the comparator circuit is preferably such that the relay in the AFCI/GFCI device will trip within 100 ms. Note that the user cannot disable arc detection at Levels 2 and 3 priority since it is desirable that the AFCI/GFCI device always trip in the presence of conditions that are determined to be dangerous.

The circuitry used to implement Level 2 priority will now be described in more detail. With reference to FIG. 13B, the average AC line current from the AC line frequency circuitry is input to the plus input of the comparator 408. A voltage reference source is input to the minus input of the comparator 408. The reference voltage is generated via pot 375 and op amp 376 which forms a voltage regulating circuit. The voltage regulating circuit provides the adjustable reference voltage for a resistive divider network which comprises resistors 398, 400, 402, 404, 406. The values of the resistors are chosen so as to create multiple reference levels of average AC line frequency current, e.g., 30, 20, 10, 5 and 2.5 A. The reference voltage created at the minus input to comparator 408 corresponds to an average AC current of 30 A on the AC line. Thus, if the level of average AC line current detected is above 30 A, the output of the comparator 408 goes high causing the output of the OR gate 422 to go high. The output of OR gate 422 is input to the OR gate 360 which functions to output the TRIG__ARC signal to the SCR trigger circuit.

Similarly, a voltage reference source is input to the minus input of the comparator 390. The reference voltage is generated via pot 377 and op amp 378 which forms a voltage regulating circuit. The voltage regulating circuit provides the adjustable reference voltage for a resistive divider network which comprises resistors 380, 382, 384, 386, 388. The values of the resistors are chosen so as to create multiple reference levels of arcing current, e.g. dangerous, high, medium and low. The reference voltage created at the minus input to comparator 390 corresponds to a dangerous arcing level. Thus, if the level of average high frequency current detected is above this level, the output of the comparator 390 goes high causing the output of the OR gate 422 to go high. The output of OR gate 422 is input to the OR gate 360 which functions to output the TRIG__ARC signal to the SCR trigger circuit.

The two comparators 390, 408 are configured to output a high in the presence of unsafe conditions. They are connected through OR gates to the SCR trigger circuit controlling the AFCI/GFCI relay. This provides Level 2 priority tripping with a trip time of approximately 100 ms. This fast trip cannot be disabled nor delayed by the user, as it is the case with Level 1 priority detection.

The output of comparator 390 goes high if unsafe arcing persists for approximately 100 ms, while the output of comparator 408 goes high if the total average current exceeds 30 A for a time duration of approximately 100 ms, i.e., six AC cycles. An average AC line current of 30 A indicates that the AFCI/GFCI safe feed through current capability is being exceeded by 50 to 100%. Note that typical GFCIs are rated for 15 to 20 A AC feed through current. When these circumstances occur, the power to the load is shut off. It is noted that average AC line and high frequency signals are used as inputs to reduce the sensitivity of the tripping action of the AFCI/GFCI to the current waveform or its frequency. Thus, the type of arc detected or the type of load powered through the AFCI/GFCI does not effect the ability of the device to trip when dangerous conditions occur. The comparator 390 reacts to high frequency currents while comparator 408 reacts to AC line frequency, i.e., 50 or 60 Hz. The output of comparator 408 goes high when the average current exceeds 30 A on the AC power line. In this fashion the device provides over current protection against continuous overloading, as well as protection against excessive peak currents exceeding 100 A for longer than 2 to 3 AC cycles.

The arc detection circuitry also comprises two banks of comparators, one associated with the average AC line current and the other associated with the average high frequency arcing current. Three comparators 410, 412, 414 have their minus inputs tapped into different reference voltage levels generated by the resistor divider 398, 400, 402, 404. The plus input of each comparator is coupled to the average AC line current voltage. The resistor values are chosen so that the output of comparator 410 will go high when the average AC line current exceeds 20 A, the output of comparator 412 will go high when the average AC line current exceeds 10 A and the output of comparator 414 will go high when the average AC line current exceeds 5 A. As previously described, the output of the comparator 408 will go high when the average AC line current exceeds the dangerous level of 30 A.

The average AC line current signal is fed to comparators 408, 410, 412, 414 through diode 372. A capacitor 418 provides further smoothing of the average AC line current signal and resistor 420 ensures that capacitor 418 discharges when the average AC line current decreases. Additional feedback resistors can be added to the plus inputs of the comparators to provide hysteresis thus reducing oscillations.

Similarly, the arc detection circuit comprises comparators 392, 394, 396 for detecting various levels of average arcing current on the line. The minus inputs of each of the comparators is coupled to different taps on the voltage divider which comprises resistors 380, 382, 384, 386, 388. The values of the voltage divider resistors are calculated to switch the output of the comparator 396 high when the average arcing current level exceeds a 'low' level. A 'low' arcing level is defined as the minimum arcing level required to start a fire. The output of the comparator 394 goes high when the average arcing current exceeds a 'medium' level. The output of the comparator 392 goes high when the average arcing current level exceeds a 'high' level. As previously described, the output of the comparator 390 goes high when the average arcing current level exceeds a level considered 'dangerous' under any circumstance. A 'dangerous' level is defined as the amount of arcing that would produce an average arcing current of 30 A.

The average arcing current voltage signal is fed to comparators 390, 392, 394, 396 through diode 374. The capacitor 446 provides further smoothing of the average arc current signal and resistor 448 provides a discharge path for capacitor 446. Additional feedback resistors can be added to the plus inputs of each of the comparators to provide hysteresis thus reducing oscillations.

Note that the integrator circuits in the AC line and high frequency circuitry that provide the input to the arc detection circuitry create a time delay of approximately 85 to 100 ms. The time delay prevents the relay from tripping and disconnecting the power during a current inrush, which always occurs when inductive, capacitive or incandescent loads are turned on (FIG. 14).

Alternatively, a delayed tripping mechanism is provided for signals with lower average arcing. These signals are given Level 1 priority. Level 1 is the lowest priority and the AFCI/GFCI will trip within 1 to 2 seconds at this level of arcing. In addition, the user has the option of delaying or preventing tripping due to Level 1 arcing through the timer circuit described in more detail hereinbelow. The user can also enable an audible warning device rather than have the AFCI/GFCI trip.

Various levels of detection are provided by the two comparator configurations 390, 392, 394, 396 and 408, 410, 412, 414. The device is able react appropriately to different levels of average AC line current and average arc current by applying the output of the comparators to a logic circuit.

In particular, the comparators 392, 410 are associated with high level arc detection, comparators 394, 412 with medium level arc detection and comparators 396, 414 are associated with low level arc detection. These various levels of arcing produce a Level 1 priority trip. Below a certain average arcing current level, an arc can be considered non dangerous because it has insufficient energy to start a fire. An example of non dangerous arcing is a static electricity discharge. The reference voltage provided to comparator 396 by the voltage divider represents an average arcing current level containing the minimum amount of energy to start a fire. This is the lowest detection point and has been experimentally determined by analyzing many arcing wave signatures.

The reference voltage for comparator 414 is preferably set to 0.5 V. This reference voltage is calculated to equal the DC voltage of the average AC line current signal when 5 A of current flows on the load side of the AFCI/GFCI device. When the average arc current signal reaches the minimum level required to be dangerous, i.e., 'low' level, the output of comparator 396 goes high. The output of the comparator 396 is input to one input of the AND gate 444. The output of comparator 414 is inverted and input to the second input of the AND gate 444. Thus, the output of AND gate 444 is high only when the a 'low,' i.e., minimum dangerous, arcing level is detected and less than 5 A flows in the load line.

The reference voltage for comparator 412 is preferably set to 1 V. This reference voltage is calculated to equal the DC voltage of the average AC line current signal when 10 A of current flows on the load side of the AFCI/GFCI device. When the average arc current signal reaches the 'medium' level, the output of comparator 394 goes high. The output of the comparator 394 is input to one input of the AND gate 426. The output of comparator 412 is inverted and input to the second input of the AND gate 426. Thus, the output of AND gate 426 is high only when the 'medium' arcing level is detected and less than 10 A flows in the load line.

The reference voltage for comparator 410 is preferably set to 2 V. This reference voltage is calculated to equal the DC voltage of the average AC line current signal when 20 A of current flows on the load side of the AFCI/GFCI device. When the average arc current signal reaches the 'high' level, the output of comparator 392 goes high. The output of the comparator 392 is input to one input of the AND gate 424. The output of comparator 410 is inverted and input to the second input of the AND gate 424. Thus, the output of AND gate 424 is high only when the a 'high' arcing level is detected and less than 20 A flows in the load line.

The table below summarizes the average arcing required for the various priority trip levels. Note that peak AC line current or peak high frequency arcing current is excess of 100 A will immediately trip the device. This is a Level 3 priority trip. The following table only describes average current trip levels.

| Average AC Line Current | Average High Frequency Arc Current | | | | |
|---|---|---|---|---|---|
| | None | Low | Medium | High | Dangerous |
| <2.5 A | No Trip | No Trip | No Trip | No Trip | Level 2 |
| <5 A | No Trip | Level 1 | Level 1 | Level 1 | Level 2 |
| <10 A | No Trip | No Trip | Level 1 | Level 1 | Level 2 |
| <20 A | No Trip | No Trip | No Trip | Level 1 | Level 2 |
| <30 A | No Trip | No Trip | No Trip | No Trip | Level 2 |
| ≥30 A | Level 2 | Level 2 | Level 2 | Level 2 | Level 2 |

Note that the example arc detection circuit of FIGS. 13A, 13B and 13C is shown comprising three levels of average arc current detection, i.e., high, medium and low, for illustrative purposes only. Higher or lower levels of average arc current detection are possible without departing from the scope of the invention. Alternatively, since relatively slowly changing DC levels are involved, A/D converters could be utilized to digitize the average AC line and high frequency signals for input into a microcontroller. The microcontroller would be suitably programmed to generate an output dependent upon the levels of the two input signals. The microcontroller could also perform a hysteresis function in software for each detection level.

As described above, the output of each of the AND gates goes high only if the average arc current detected is greater than the level permitted for a particular level of average AC line current. This also implies that for every level of average AC line current, there is a level of average arc current which is tolerated, e.g., as a byproduct of the particular load such as vacuum cleaners, electric shavers, food processing appliances, etc. These common appliances each have an amount of arcing associated with their operation. The level of arcing signal produced by these appliances is generally lower than the signal from an uncontrolled arc with the same current flow. Thus, because the arc detection circuitry tolerates a specific amount of arcing for each level of AC line current, false tripping of the device is prevented whenever these types of appliances are used.

The outputs of the AND gates 424, 426, 444 are input to an OR gate 428. If any of the outputs of the AND gate go high, the output of the OR gate 428 goes high. The output of the OR gate 428 is input to AND gate 434.

An additional comparator 416 is included in the arc detection circuit to eliminate any false tripping due to noise on the AC line. The noise may be created by spikes generated by various sources, RF pickup or electrostatic discharge such as when someone walks on a dry nylon carpet and touches the housing of an outlet or extension cord. In addition, an appliance like an electric shaver, may generate a substantial amount of arcing noise yet consume minimal current thus falsely tripping the device. The comparator 416 causes the above type disturbances, white noise, light dimmer noise, etc. to be ignored, therefore increasing the noise immunity of the arc detector.

The comparator 416 is at the lowest position on the totem pole structure for average AC line current detection. The reference voltage, input to the minus input of the comparator, is set by the variable resistor 406. Comparator 416 functions to keep the output of AND gate 434 low when less than a minimum current level is flowing through the AFCI/GFCI. The output of the AND gate 434 can only go high if the average AC line current is above a minimum level. In the example presented herein, this level is arbitrarily set to 2.5 A. Thus, only arc faults that contain sufficient energy to start a fire will trip the arc detector.

As is well known, electrical energy is represented as $P=I^2R$ or $VI$, therefore as I approaches zero the energy in an arc approaches zero. Hence, the power becomes negligibly small and it can be considered a static arc. As an illustrative example, walking on a dry nylon carpet can produce static voltages as high as 50,000 V yet the current is only a few $\mu A$. Thus, the total energy in the arc is in the mW range which is not sufficient to start a fire.

The output of the AND gate 434 is input to the plus input of comparator 442 via resistor 430 and capacitor 432. The resistor 430 and capacitor 432 function to generate a delay of 1 to 2 seconds. Small short lived arcs that persist for longer than 100 ms, but are not continuous, are not normally dangerous. The 1 to 2 second delay causes these intermittent arcs to be ignored, e.g., those produced by opening and closing switches. The delay also provides greater noise immunity from sporadic or short lived noise sources such as lighting controls. The output of comparator 442 goes high when the voltage on the capacitor 432 exceeds the reference voltage set by the divider 436, 438. Hysteresis is provided by resistor 443 which prevents the comparator from oscillating. The comparator 442 also functions as a buffer for the following stages. The output of comparator 442 is input to the timer circuitry and local/remote inhibit circuitry. In addition, the output of the comparator 442 can optionally be input to an audible alarm 440 which can comprise a buzzer or other type of well known audible alarm device. Optionally, a user controlled switch can be connected to the output of the comparator 442 to provide the option of driving the audible alarm indicating a Level 1 priority arc fault or to trip the device via the timer circuitry described hereinbelow.

A problem associated with prior art AFCIs is that they annoyingly trip when equipment or appliances that produce heavy arc like signals, e.g., arc welders, are used. The present invention comprises timer circuitry 186 (FIG. 6) which functions to temporarily disable the detection of arc faults for a period of time such as minutes or even hours. The detection of any arcing during the time that the detector output is disabled, causes the period of disablement to extend by a time equal to the total time that arcing is detected. Thus, if arc detection is disabled for one hour and 10 minutes, and arcing is detected during that time, the detector becomes enabled one hour and 10 minutes later. In this manner, arc detection can be remain disabled for longer periods of time thus permitting the user uninterrupted use of the equipment or appliance.

Figure 15:
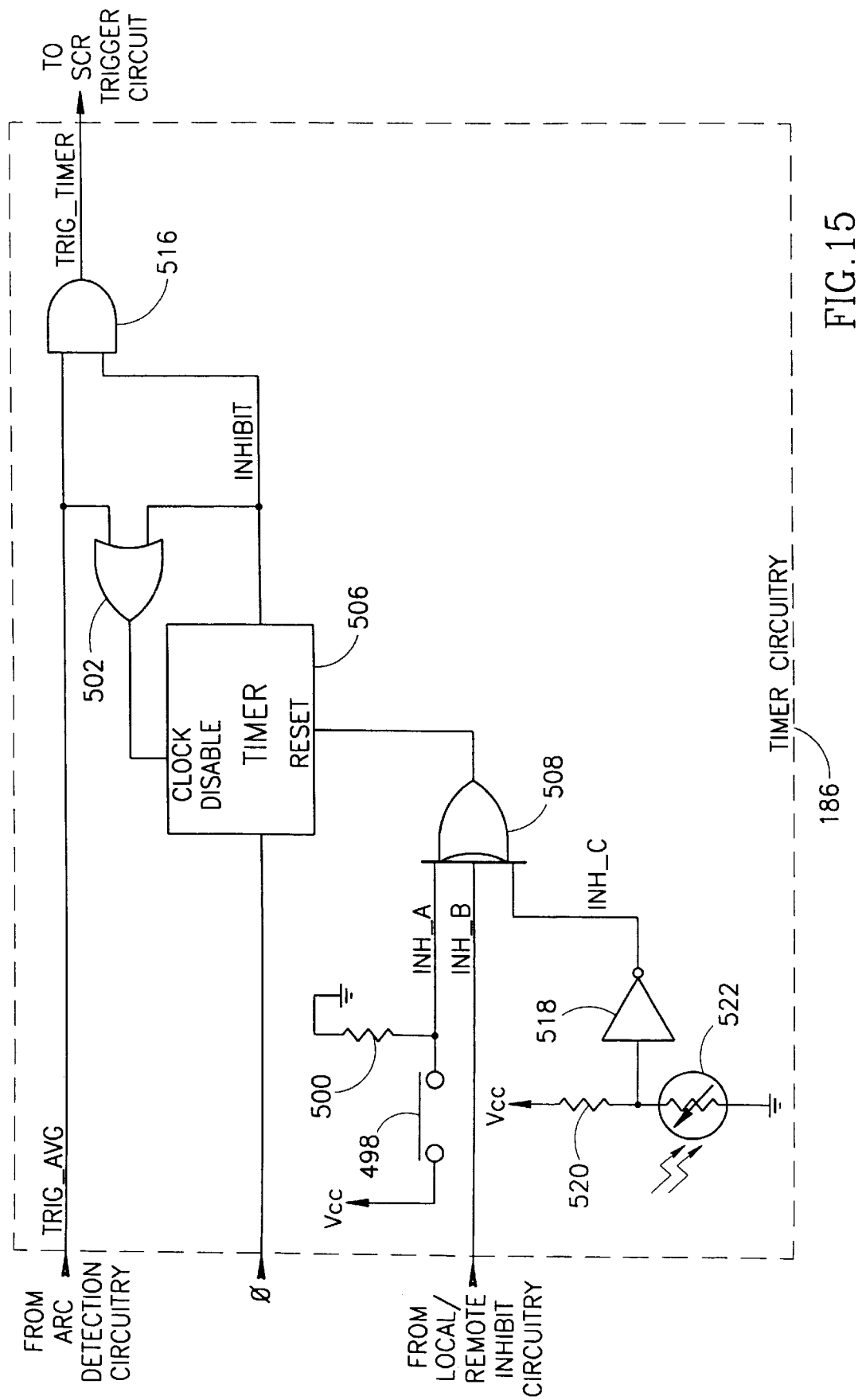
FIG. 15 is a schematic diagram illustrating the timer circuitry portion of the arc fault detection device of the present invention in more detail.

A schematic diagram illustrating the timer circuitry portion of the arc fault detection device of the present invention in more detail is shown in FIG. 15. The function of the timer circuitry 186 is to generate an active low $\overline{\text{INHIBIT}}$ signal that is gated with the Level 1 priority related TRIG__AVG signal output by the arc detection circuitry. The $\overline{\text{INHIBIT}}$ signal is generated by a timer 506 and is normally high. The $\overline{\text{INHIBIT}}$ signal is gated with the TRIG__AVG signal via AND gate 516 to generate the TRIG__TIMER signal. The TRIG__TIMER signal is then input to the SCR trigger circuit 236 (FIG. 7). Since the output of the timer is normally high, the TRIG__AVG signal is normally enabled so that the relay can trip. The application of an active high pulse to the RESET input of the timer starts the timer running. When a pulse is applied the reset input, the $\overline{\text{INHIBIT}}$ signal is pulled low until the timer count reaches a specified number of clock cycles. During the time that the $\overline{\text{INHIBIT}}$ signal is low, the TRIG__TIMER signal is disabled. After the disablement of the timer ends, the $\overline{\text{INHIBIT}}$ signal returns to its active high state.

The 50 or 60 Hz phase conductor of the AC line serves as the clock source for the timer 506. The timer comprises zero detecting means, well known in the art, for detecting the zero crossings of the AC wave which forms the timer input clock signal. Within the timer, the 50 or 60 Hz high voltage sine wave is converted to a low voltage square wave of the same frequency. The timer also comprises counting means, such as a plurality of Johnson counters. The internally generated square wave is used as the clock input for the counters. By suitable selection of the counter means, any time period can be arbitrarily generated by the timer. For example, with 60 Hz AC power and a divide by 216,000 counter, the timer output returns to a high state one hour after being reset.

A gate (not shown) separates the clock generator from the counters within the timer. This gate is controlled by an input labeled CLOCK DISABLE, which is internally latched. When the CLOCK DISABLE input is high, the clock is prevented from driving the counters. Thus, the timer is "paused" until the CLOCK DISABLE input is removed. When the CLOCK DISABLE input is returned to active low the timer resumes counting from the point at which it paused.

The timer also comprises a RESET input. An active high pulse on the RESET input forces the output of the timer, i.e., the $\overline{\text{INHIBIT}}$ signal, low and sets all the counter registers to zero. The timer is preferably of the resetable type, i.e., it can be made to start counting from zero at any time, even during counting. A continuous active high on the RESET input will keep the counter at zero and therefore keep the $\overline{\text{INHIBIT}}$ signal permanently low.

When the $\overline{\text{INHIBIT}}$ signal is high, the CLOCK DISABLE input of the timer is pulled high via the output of OR gate 502. This prevents the timer from counting further and latches the timer in a high output state.

As described previously, the detection of a priority Level 1 arc fault will extend the period of disablement. Assuming the $\overline{\text{INHIBIT}}$ signal is low, i.e., the timer is counting, a high TRIG__AVG signal will produce a high at the CLOCK DISABLE input of the timer through the OR gate 502. Thus, the timer pauses for the period of time that the TRIG__AVG signal is high. This means that the re-enabling of the TRIG__TIMER signal is delayed by the amount of time that the TRIG__AVG signal is high. If the timer is not counting, i.e., the $\overline{\text{INHIBIT}}$ signal is high, then the TRIG__AVG signal has no effect on the timer.

This method of delaying the timer is used to ensure that the TRIG__TIMER signal will always be re-enabled, even if arcing starts while the timer is counting. Priority Level 1 arcing is intermittent in form, as there is not enough energy to sustain arcing for long periods. Therefore, even if Priority Level 1 arcing starts while the timer is counting, the counter will still be incremented during the gaps between arcing, and arc detection will be enabled at some time after arcing began. Thus, the timer circuit significantly reduces tripping due to the normal arcing generated by equipment and appliances, while ensuring that the GFCI/AFCI will eventually trip in the presence of arcs. Note that arcing at Priority Levels 2 and 3 is never disabled.

While the timer is counting, the $\overline{\text{INHIBIT}}$ signal is low, thus disabling the TRIG__TIMER signal. A light emitting diode (LED) 512 is connected to the output of the timer 506. The LED is also connected to the power supply $V_{CC}$ via a current limiting resistor 510. When the $\overline{\text{INHIBIT}}$ signal is low, the LED is lit indicating that arc detection has been temporarily disabled. When the $\overline{\text{INHIBIT}}$ signal is high the LED is extinguished indicating that arc detection is enabled.

Three signals combine to form the RESET signal: INH__A, INH__B and INH__C. These three signals are gated together through OR gate 508 to generate the RESET signal input to the RESET input of timer 506. Thus, INH__A, INH__B or INH__C going high will reset the timer. The three signals input to the OR gate 508 will now be described in more detail.

The timer can be reset by a user by pressing momentary push button switch 498. The INH__A signal, which is normally pulled low through resistor 500 tied to ground, is momentarily pulled active high. One alternative is to gang the switch 498 to the switch mechanism that provides the test pulse for the GFCI circuit. Arc detection is then disabled for a predetermined time period when the GFCI is tested. In other words, testing the GFCI before an appliance like a vacuum cleaner is used in the house will ensure that the device will not trip when the vacuum is used. Arc detection is automatically enabled a timer period after use of the arc generating appliance is disconnected.

As described previously, the output of the timer is normally high, allowing arc detection. One alternative is for the $\overline{\text{INHIBIT}}$ signal to go high immediately upon the power first being applied to the AFCI device. An alternative is for the timer to be reset upon power being applied. A third and preferred alternative is for the $\overline{\text{INHIBIT}}$ signal to be pulled low for a few AC cycles, e.g., 1 second, and then allowed to go active high. It produces greater noise immunity, as the transients associated with the power being applied will be ignored by the AFCI circuitry. Moreover, the AFCI is not inhibited for a long period of time unnecessarily.

In situations where arc generating machinery is used throughout the day, such as in a factory with arc welding machinery, the detection of arc faults is only practical at night. Thus, the AFCI should be disabled during the day and enabled at night. A photoelectric cadmium selenide or cadmium sulfide photocell 522 is provided to inhibit Level 1 priority arc faults from tripping the device. The photocell 522 is connected to $V_{CC}$ via resistor 520. During daylight hours, the resistance of the photocell drops to a very low value, creating a low at the input to inverter 518. The output of the inverter INH__C goes high causing the RESET input of the timer to go high. This disables the TRIG__AVG signal from tripping the device. Conversely, at night or in the absence of light, the resistance of the photocell 522 rises to a high value causing the input to the inverter 518 to go high. The inverter output goes low, removing the INH__C signal, enabling the timer and permitting the arc detector to trip. Note that in the absence of light, the resistance of a cadmium selenide photocell may rise to 100 MΩ or more.

Figure 16:
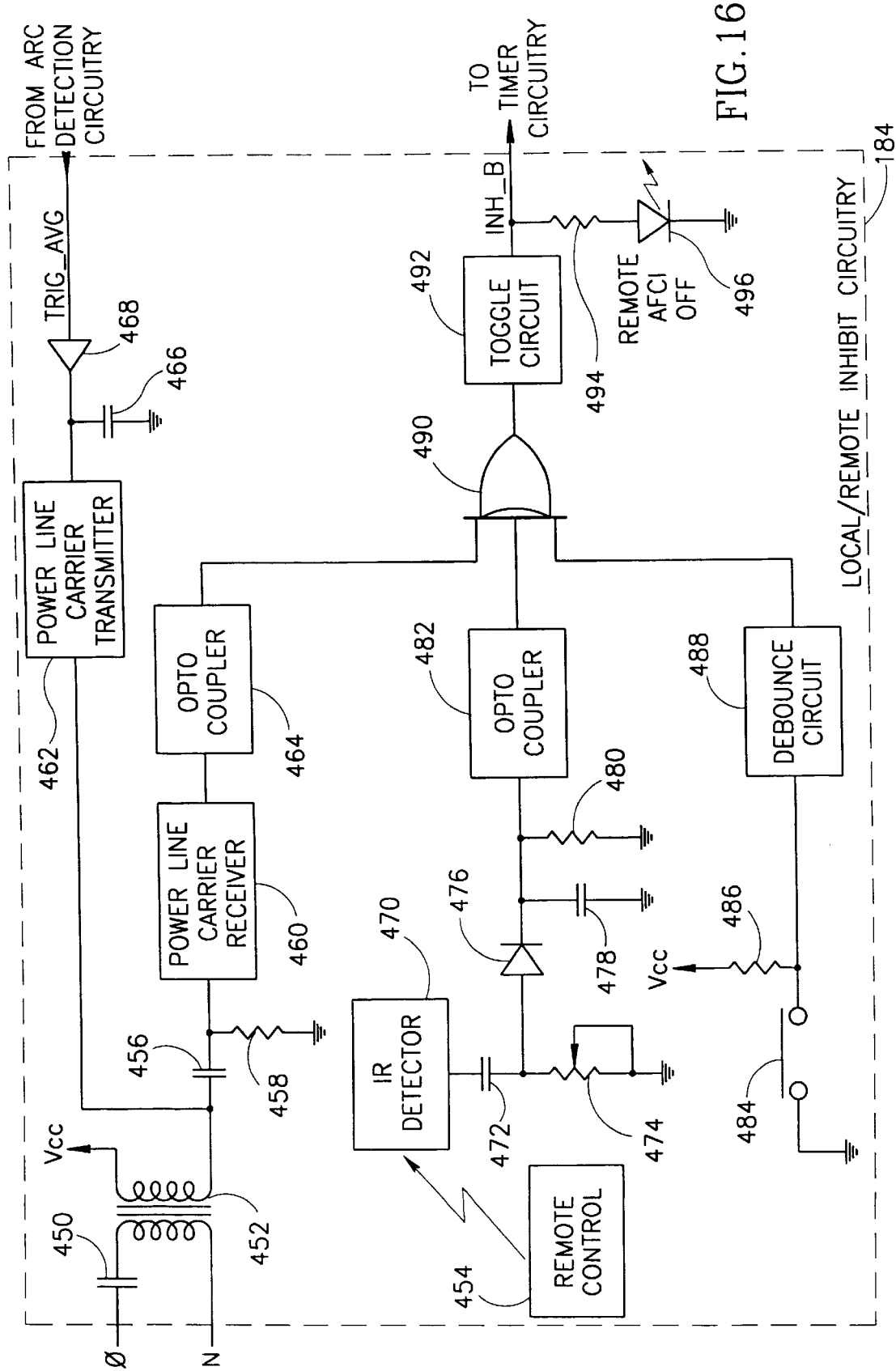
FIG. 16 is a schematic diagram illustrating the local/remote inhibit circuitry portion of the arc fault detection device of the present invention in more detail.

A third source, INH_B, for the RESET input is also input to the OR gate 508. This INH_B signal is generated by the local/remote inhibit circuitry which will now be described in more detail. A schematic diagram illustrating the local/remote inhibit circuitry portion of the arc fault detection device of the present invention in more detail is shown in FIG. 16. The local/remote inhibit circuitry 184 comprises circuitry that also inhibits the TRIG_AVG signal from tripping the device. The local/remote inhibit circuitry 184 can be constructed as an integral part of the AFCI/GFCI device or it can be constructed in its own external housing and connected to the main embodiment by a plurality of wires. The local/remote inhibit circuitry functions to turn the device on and off via momentary push button, turn the AFCI on and off via an infrared receiver, turn the AFCI on and off via a signal from any suitable communication means and send a signal via any suitable communication means, indicating the occurrence of an arc fault, to a remotely located receiver.

Infrared (IR) reception is achieved through IR detector 470 which may comprise an infrared diode which functions to pickup the pulsing signal from an IR transmitter 454. The transmitter may comprises a fixed transmitter or, in the alternative, any TV or stereo remote control that emits IR pulses modulated by a frequency in the range of 30 to 45 KHz. A receiving diode in the IR detector 470 changes its impedance upon reception of IR pulsing energy. The capacitor 472 passes these pulses through to resistor 474 while blocking DC. This limits the sensitivity of the device to any constant or slowly changing light level, e.g., daylight. The pulsating DC across pot 474 charges the capacitor 478 through diode 476. The resulting DC level is input to an opto coupler 482. Current flowing to the input of the opto coupler causes its output to go high. The output of the opto coupler is input to an OR gate 490. A high output of the opto coupler causes the output of the OR gate to go high.

The output of the OR gate 490 is input to a toggle circuit 492. The toggle circuit 492 operates in one of two alternative, user selected modes. In the first mode, the toggle circuit 492 functions to flip its output from low to high or high to low upon each low to high transition of its input. In the second mode, the toggle circuit 492 functions to produce an active high pulse upon each low to high transition of its input.

The output of the toggle circuit 492 forms the INH_B signal, which is input to the OR gate 508 (FIG. 15). In the first toggle switch mode, the INH_B signal is held high until another input to the toggle circuit occurs. The arc detector is disabled until the local/remote inhibit circuitry releases the INH_B signal. In the second toggle switch mode, the INH_B pulse resets the timer but the AFCI is enabled automatically after the predetermined time period.

The status of the output of the local/remote inhibit circuit output is indicated via LED 496, which is connected to INH_B via resistor 494. In the first toggle switch mode, the lighted LED indicates that the AFCI is being disabled via remote means. In the second toggle switch mode, a flash of the LED 496 indicates that a reset pulse has been sent to the timer 506 (FIG. 15).

In addition, the circuitry 184 also comprises circuitry to enable a user to reset the timer or permanently disable the AFCI/GFCI device from a remote location. One end of momentary push button switch 484 is connected to ground and the other end is connected to a debounce circuit 488. The input to the debounce circuit 488 is held high by resistor 486 tied to $V_{CC}$. The output of the debounce circuit is input to OR gate 490. The debounce circuit functions to output a low while the switch 484 is open. When the switch is closed, the output of the debounce circuit 488 goes high causing the output of the OR gate 490 to go high, toggling the INH_B signal.

The local/remote inhibit circuitry 184 also comprises the capability to receive an on/off command via suitable communication means. For example, such communication means may comprise any power line carrier, RF, twisted pair or IR communication technology. An example of power line carrier communications include Lon Works and CEBus communications systems. By way of example only, the present invention comprises a power line carrier receiver 460, such as the CCS receiver manufactured by Leviton Manufacturing, Little Neck, N.Y., functions to receive a signal transmitted over the power line, decode and interpret the received command and output a signal to the opto coupler 464. The CCS power line carrier signal is modulated by a carrier of 121 KHz. This signal is extracted from the AC line through capacitor 450 and coupling transformer 452. The capacitor 456 and resistor 458 function to high pass filter the input to the receiver 460. The output of the opto coupler 464 is input to the OR gate 490. Thus, a high output of the opto coupler 464 causes the INH_B output of the toggle circuit 492 to change states.

In addition, the present invention comprises communication means, e.g., power line carrier transmitter 462, to transmit arc fault information to a remotely located receiver, pinpointing the location of the fault. Other types of communications may be substituted for power line carrier without departing from the scope of the invention. A dedicated indicator panel can be connected to the remote receiver where arc fault information is monitored by building personnel. This feature is desirable in industrial or commercial facilities, such as schools, supermarkets, etc. where the electrical system is centrally supervised.

The TRIG_AVG signal from the arc detection circuitry is input to buffer 468 whose output is smoothed via capacitor 466. The output of the buffer 468 is input to the transmitter 462 which functions to generate an output signal based on the state of TRIG_AVG. Though arcing may cease or be intermittent, the capacitor 466 maintains sufficient charge to keep the transmitter 462 activated long enough to transmit the required information through the AC line. The transmitter 462 comprises power transistor means to transfer the output of the transmitter onto the AC line via the line side phase and neutral terminals. Note that both the phase and neutral line connections and the indicator panel are located upstream of the AFCI/GFCI so that they are not disconnected in the event the device trips.

In addition, it is noted that even if the timer has been triggered, temporarily inhibiting the TRIG_AVG signal, the occurrence of an arc fault is nevertheless transmitted to the remote indicator via the transmitter 462. It is desirable to have an indication of an arc fault even if it is generated from equipment or appliances. Alternatively, the TRIG_TIMER signal can be input to the transmitter 462 thus preventing notification of arc faults while the $\overline{\text{INHIBIT}}$ signal is low.

As discussed previously, the arc detector of the present invention can be used a stand alone arc fault detector or combined with other types of circuit interrupting devices in addition to a GFCI. When used as a stand alone device, the AFCI/GFCI circuit of FIG. 7 is modified to include only arc fault related circuitry. In particular, the two GFCI related transformers 233, 234 and their related circuitry including the LM1851 IC 225 would be removed. The SCR trigger circuit 236 would need only two inputs, i.e., TRIG_ARC and TRIG_TIMER. The remainder of the circuit would remain, i.e., MOV, diode bride, coil, power supply, relay switches, etc.

In addition to a GFCI, the arc detector can be combined with an Immersion Detection Circuit Interrupter (IDCI) device which is in more detail in U.S. Pat. No. 4,709,293, issued to Gershen et al. and entitled SHOCK HAZARD PROTECTION SYSTEM. Such a combination AFCI/IDCI device will now be described in more detail.

Figure 17:
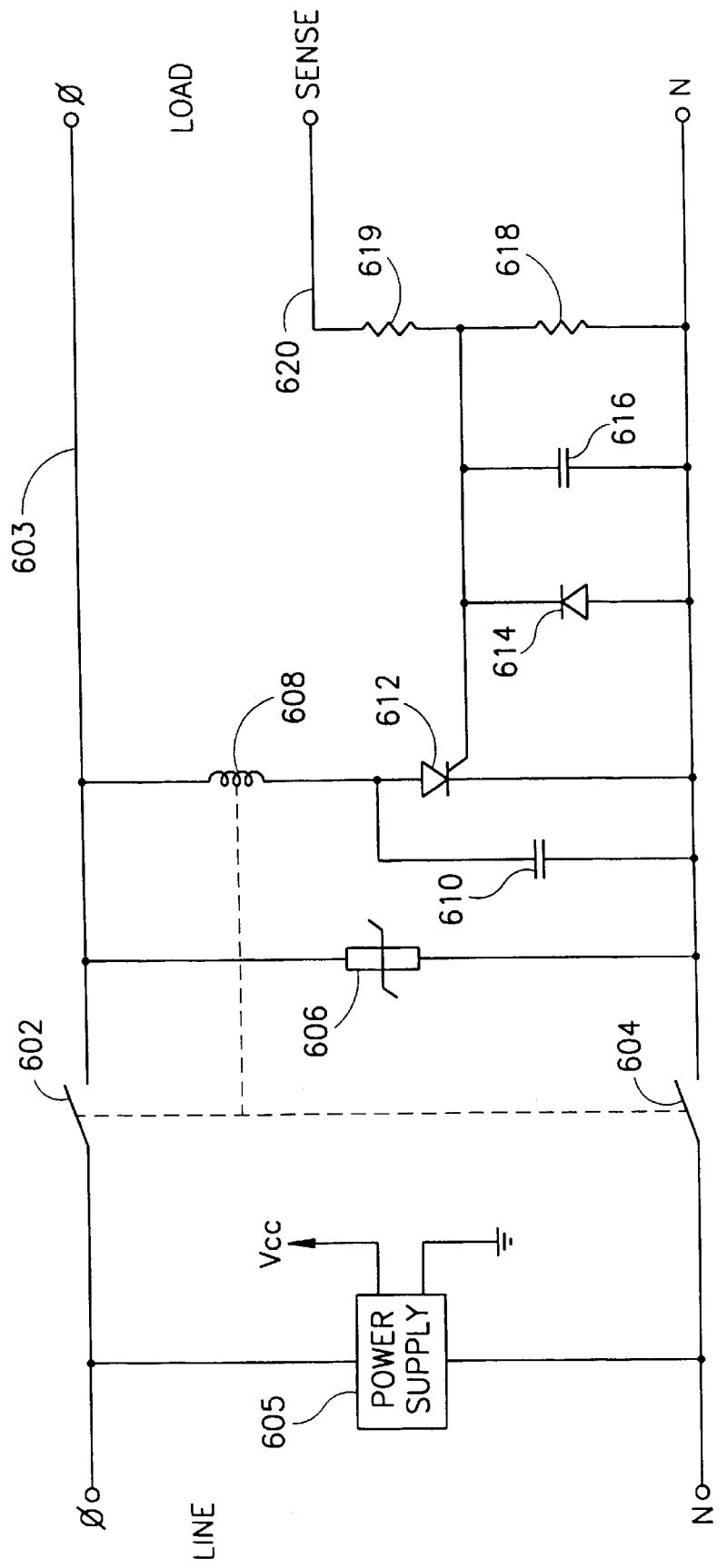
FIG. 17 is a schematic diagram illustrating an example of a prior art immersion detection circuit interrupter device.

A description of the prior art IDCI device precedes a description of the combination AFCI/IDCI device. A schematic diagram illustrating a prior art IDCI is shown in FIG. 17. The circuit, generally referenced 600, comprises a pair of immersion detection conductors 603, 620, which are positioned in a non-conducting relationship within the electrical load preferably in a location where water can enter. The circuit 600 comprises SCR 612, capacitor 610, diode 614, capacitor 616, resistor 618, metal oxide varistor (MOV) 606 and relay coil 608. The relay 608 controls the opening of normally closed relay contacts 602, 604 connected to the phase and neutral conductors, respectively, of the AC line. In addition the circuit 600 comprises a power supply 605 connected between phase and neutral which functions to generate $V_{CC}$ to power the circuit.

A water related shock hazard is detected when both immersion detection conductors 603, 620 are immersed in water. This causes the AC line voltage to be connected to the gate of the SCR 612. In response, the SCR turns on and energizes the coil 608 causing switches 602, 604 to open, thus disconnecting AC power from the electrical appliance.

Figure 18:
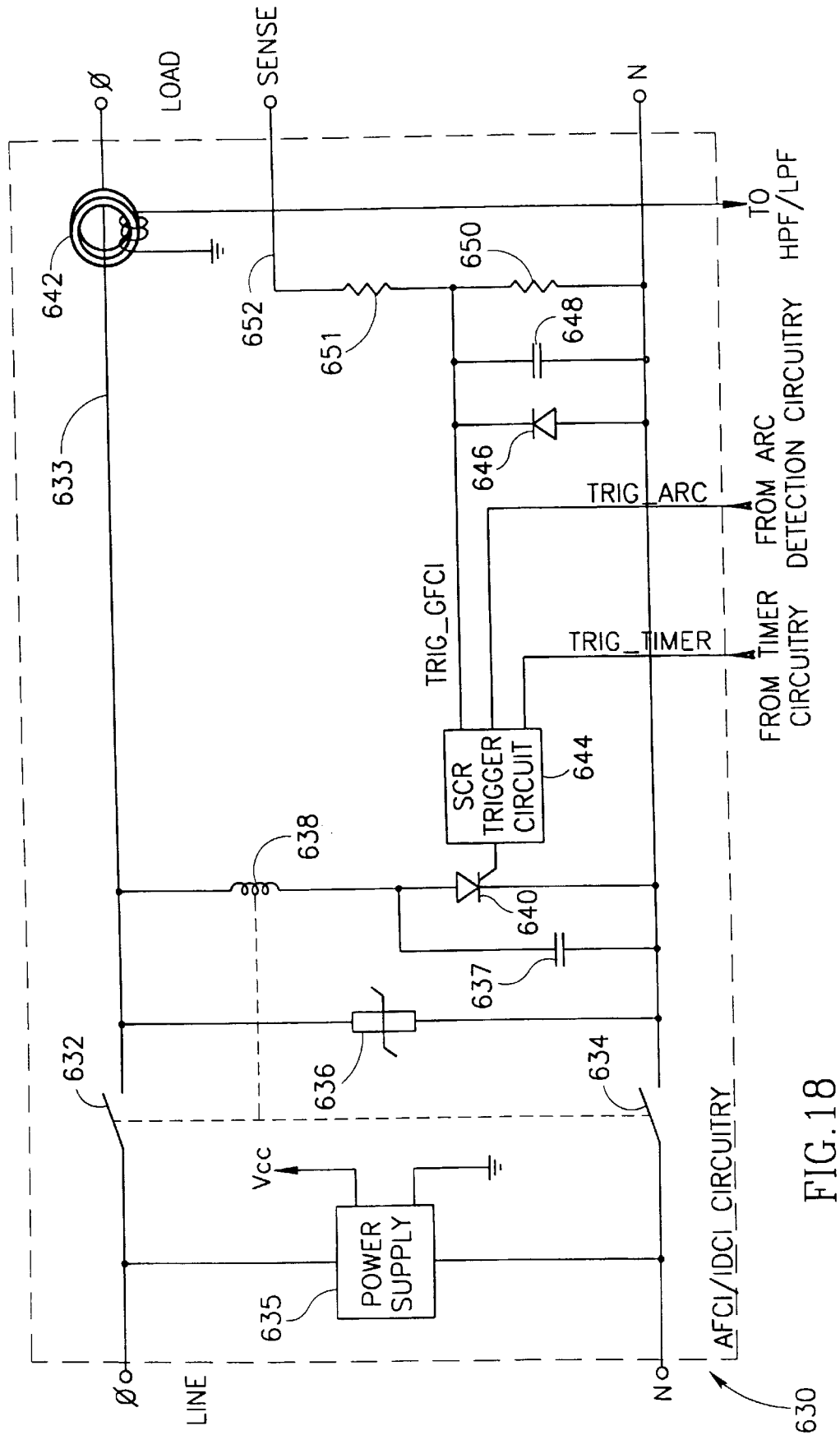
FIG. 18 is a schematic diagram illustrating the combination arc fault detector and immersion detection circuit interrupter device of the present invention.

A schematic diagram illustrating the arc fault detector with immersion detection circuit interrupter constructed in accordance with the present invention is shown in FIG. 18. The circuit presented in FIG. 18 can be utilized in place of the AFCI/GFCI circuitry of FIG. 7. The remainder of the circuit, i.e., local/remote inhibit circuitry 184, timer circuitry 186, high frequency circuitry 188, AC line frequency circuitry 200 and arc detection circuitry 198, as shown in FIG. 6, remains the same.

The circuit, generally referenced 630, comprises a pair of immersion detection conductors 633, 652, which are positioned in a non-conducting relationship within the electrical load preferably in a location where water can enter. The circuit 630 comprises SCR 640, capacitor 637, diode 646, capacitor 648, resistor 650, MOV 636 and relay coil 638. The relay 638 controls the opening of normally closed relay contacts 632, 634 connected to the phase and neutral conductors, respectively, of the AC line. In addition, the circuit 630 comprises a power supply 635 connected between phase and neutral which functions to generate $V_{CC}$ to power the circuit.

As in the prior art circuit of FIG. 17, a water related shock hazard is detected when both immersion detection conductors 633, 652 are immersed in water. This causes the AC line voltage to be connected to the gate of the SCR 640. In response, the SCR turns on and energizes the coil 638 causing switches 632, 634 to open, thus disconnecting AC power from the electrical appliance.

The transformer 642 operates in similar fashion to the transformer 229 of the AFCI/GFCI circuitry shown in FIG. 7. The transformer 642 generates a peak output voltage that is nearly linearly proportional to the peak current flowing through it. The output of the transformer 642 forms the input to the high frequency circuitry 188 and the AC line frequency circuitry 200 as shown in FIGS. 11 and 12.

The SCR trigger circuit 644, which provides the gate signal for the SCR 640, functions to isolate the various trigger signals from each other. The three inputs to the SRC trigger circuit 644 include TRIG_IDCI, TRIG_ARC and TRIG_TIMER. The SCR trigger circuit applies an OR function to the three inputs whereby any of the three input signals going active will cause the SCR 640 to be triggered.

In similar fashion to the GFCI and IDCI devices described above, one skilled in the electrical arts could modify a conventional ALCI so as to incorporate the arc fault detection circuitry of the present invention.

While the invention has been described with respect to a limited number of embodiments, it will be appreciated that many variations, modifications and other applications of the invention may be made.

We claim:

1. A circuit interrupting device capable of being electrically connected to an electrical wiring system between line side phase and neutral conductors and load side phase and neutral conductors, the device comprising:

switching means for disconnecting a source of electrical power between at least the line side phase conductor to the load side phase conductor;

trigger circuit means for causing said switching means to disconnect the source of electrical power to the load side phase conductor; and arc fault detecting means for detecting in said electrical wiring system arc faults occurring in a high frequency range and arc faults occurring in an AC line frequency range, and for generating a trigger signal in response to the occurrence of an arc fault in at least one of said high frequency range and said AC line frequency range that activates said trigger circuit means.

2. The device according to claim 1, wherein said high frequency range is at least about 500 KHz.

3. The device according to claim 1, wherein said AC line frequency range is between about 50 Hz. and about 60 Hz.

4. The device according to claim 1, wherein said arc fault detecting means uses peak and average signals in said high frequency range to detect arc faults occurring in said high frequency range.

5. The device according to claim 1, wherein said arc fault detecting means uses peak and average signals in said AC line frequency range to detect arc faults occurring in said AC line frequency range.

6. The device according to claim 1, wherein said arc fault detecting means comprises:

current measurement means for sensing a level of current flowing through the device;

high frequency circuit means for generating said peak and average high frequency signals, wherein said peak high frequency signal corresponds to a peak level of high frequency current flowing through the device, and wherein said average high frequency signal corresponds to an average level of high frequency current flowing through the device;

AC line frequency circuit means for generating peak and average AC line frequency signals, wherein said peak AC line frequency signal corresponds to a peak level of AC line frequency current flowing through the device, and wherein said average AC line frequency signal corresponds to an average level of AC line frequency current flowing through the device; and means for generating said trigger signal.

7. The device according to claim 6, wherein said means for generating said trigger signal generates said trigger signal when either said peak high frequency signal exceeds a predetermined threshold or said peak AC line frequency signal exceeds a predetermined threshold.

8. The device according to claim 6, wherein said means for generating said trigger signal generates said trigger signal when either said average high frequency signal exceeds a predetermined threshold or said average AC line frequency signal exceeds a predetermined threshold.

9. The device according to claim 6, wherein said means for generating said trigger signal generates said trigger signal after a time delay, said time delay being dependent upon a level of arcing detected or on a level of said sensed current.

10. The device according to claim 6, wherein said means for generating said trigger signal generates said trigger signal based on a plurality of arc fault trip levels which are dependent on a magnitude of said average AC line frequency current.

11. The device according to claim 6, wherein said means for generating said trigger signal generates said trigger signal based on a plurality of arc fault trip levels which are dependent on a level of said sensed current.

12. The device according to claim 1, further comprising means for at least partially disabling said arc fault detecting means for a finite period of time to permit a user to use an electrical device exhibiting arcing, and for enabling said disabled arc fault detecting means after use of the electrical device exhibiting arcing has been discontinued.

13. The device according to claim 1, further comprising means for receiving an external disable command and disabling at least a portion of said arc fault detecting means.

14. The device according to claim 1, further comprising means for manually disabling and enabling at least a portion of said arc fault detecting means.

15. The device according to claim 1, further comprising means for disabling at least a portion of said arc fault detecting means during daylight hours, and for enabling said disabled portion of said arc fault detecting means during night hours.

16. The device according to claim 1, further comprising means for disabling and enabling at least a portion of said arc fault detecting means in accordance with signals received from a remote transmitter.

17. The device according to claim 1, further comprising fault detection means for detecting a fault other than an arc fault, and for activating said trigger circuit means when a fault other than an arc fault is detected.

18. The device according to claim 17, wherein said fault detection means comprises a ground fault circuit interrupter capable of detecting the occurrence of a ground fault and generating a trigger signal in response to the detection of the ground fault that activates said trigger circuit means.

19. The device according to claim 17, wherein said fault detection means comprises an immersion detection circuit interrupter capable of detecting the occurrence of an immersion fault and generating a trigger signal in response to the detection of the immersion fault that activates said trigger circuit means.

20. The device according to claim 17, wherein said fault detection means comprises an appliance leakage circuit interrupter capable of detecting the occurrence of an appliance leakage fault and generating a trigger signal in response to the detection of the appliance leakage fault that activates said trigger circuit means.

21. The device according to claim 1, further comprising communication means for communicating when said trigger circuit means causes said switching means to disconnect the source of electrical power to said load side phase conductor.

22. A circuit interrupting device capable of being electrically connected to an electrical wiring system between line side phase and neutral conductors and load side phase and neutral conductors, the device comprising:
a switch capable of disconnecting a source of electrical power between at least the line side phase conductor and the load side phase conductor;
a trigger circuit that causes said switch to disconnect the source of electrical power to the load side phase conductor;
an arc fault detector operatively associated with at least one of the phase and neutral conductors of the electrical wiring system to sense current flowing through the device, said arc fault detector being capable of generating peak and average high frequency signals and peak and average AC line frequency signals from the sensed current, and capable of detecting arc faults in said AC high frequency and AC line frequency signals and generating a trigger signal in response to at least one of said peak high frequency signal, said average high frequency signal, said peak AC line frequency signal and said average AC line frequency signal, that activates said trigger circuit.

23. The device according to claim 22, wherein said arc fault detector comprises:
a high frequency circuit that receives the sensed current and generates said peak and average high frequency signals, wherein said peak high frequency signal corresponds to a peak level of high frequency current flowing through the device, and wherein said average high frequency signal corresponds to an average level of high frequency current flowing through the device; and
an AC line frequency circuit that receives the sensed current and generates said peak and average AC line frequency signals, wherein said peak AC line frequency signal corresponds to a peak level of AC line frequency current flowing through the device, and wherein said average AC line frequency signal corresponds to an average level of AC line frequency current flowing through the device.

24. The device according to claim 22, wherein said arc fault detector generates said trigger signal when either said peak high frequency signal exceeds a predetermined threshold or said peak AC line frequency signal exceeds a predetermined threshold.

25. The device according to claim 22, wherein said arc fault detector generates said trigger signal when either said average high frequency signal exceeds a predetermined threshold or said average AC line frequency signal exceeds a predetermined threshold.

26. The device according to claim 22, wherein said arc fault detector generates said trigger signal after a time delay, said time delay being dependent upon a level of arcing detected from said sensed current.

27. The device according to claim 22, wherein said arc fault detector generates said trigger signal based on a plurality of arc fault trip levels which are dependent on a magnitude of said average AC line frequency current.

28. The device according to claim 22, wherein said arc fault detector generates said trigger signal based on a plurality of arc fault trip levels which are dependent on said sensed current.

29. The device according to claim 22, further comprising means for simultaneously detecting peak and average magnitudes of said high frequency current and said AC line frequency current.

30. The circuit interrupting device according to claim 22, further comprising timer means for at least partially disabling said arc fault detection for a finite period of time to permit a user to use an electrical device exhibiting arcing, and for re-enabling said first arc fault detecting means after use of the electrical device exhibiting arcing has been discontinued.

31. The circuit interrupting device according to claim 22, further comprising a fault detector capable of detecting a fault other than an arc fault, and for activating said trigger circuit when a fault other than an arc fault is detected.

32. The circuit interrupting device according to claim 31, wherein said fault detector comprises a ground fault circuit interrupter capable of detecting the occurrence of a ground fault and generating a trigger signal in response to the detection of the ground fault that activates said trigger circuit.

33. The circuit interrupting device according to claim 31, wherein said fault detector comprises an immersion detection circuit interrupter capable of detecting the occurrence of an immersion fault and generating a trigger signal in response to the detection of the immersion fault that activates said trigger circuit.

34. The circuit interrupting device according to claim 31, wherein said fault detector comprises an appliance leakage circuit interrupter capable of detecting the occurrence of an appliance leakage fault and generating a trigger signal in response to the detection of the appliance leakage fault that activates said trigger circuit.

35. An arc fault circuit interrupter device capable of being electrically connected to an electrical wiring system between line side phase and neutral conductors and load side phase and neutral conductors, said device comprising:

a switch connected between at least said line side phase conductor and said load side phase conductor;

a trigger circuit operatively connected to said switch such that activation of said trigger circuit causes said switch to disconnect a source of electrical power to the load side phase conductor; and an arc fault detector capable of detecting in said electrical wiring system arc faults occurring in a high frequency range and arc faults occurring in an AC line frequency range, said arc fault detector responding to the detection of an arc fault in at least one of said high frequency range and said AC line frequency range by generating a trigger signal that causes said trigger circuit to activate said switch.

36. The device according to claim 35, wherein said high frequency range is at least about 500 KHz.

37. The device according to claim 35, wherein said AC line frequency range is between about 50 Hz. and about 60 Hz.

38. The device according to claim 35, wherein said arc fault detector uses peak and average signals in said high frequency range to detect arc faults occurring in said high frequency range.

39. The device according to claim 35, wherein said arc fault detector uses peak and average signals in said AC line frequency range to detect arc faults occurring in said AC line frequency range.

40. The device according to claim 35, wherein said arc fault detector comprises:

a current measurement circuit capable of sensing current flowing through the device;

a high frequency circuit capable of generating peak and average high frequency signals, wherein said peak high frequency signal corresponds to a peak level of high frequency current flowing through the device, and wherein said average high frequency signal corresponds to an average level of high frequency current flowing through the device;

an AC line frequency circuit capable of generating peak and average AC line frequency signals, wherein said peak AC line frequency signal corresponds to a peak level of AC line frequency current flowing through the device, and wherein said average AC line frequency signal corresponds to an average level of AC line frequency current flowing through the device; and a trigger generator circuit responsive to at least one of said peak high frequency signal, said average high frequency signal, said peak AC line frequency signal and said average AC line frequency signal, to generate said trigger signal.

41. The device according to claim 40, wherein said trigger generator circuit generates said trigger signal when either said peak high frequency signal exceeds a predetermined threshold or said peak AC line frequency signal exceeds a predetermined threshold.

42. The device according to claim 40, wherein said trigger generator circuit generates said trigger signal when either said average high frequency signal exceeds a predetermined threshold or said average AC line frequency signal exceeds a predetermined threshold.

43. The device according to claim 40, wherein said trigger generator circuit generates said trigger signal after a time delay, said time delay being dependent upon a level of arcing detected or on a level of said sensed current.

44. The device according to claim 40, wherein said trigger generator circuit generates said trigger signal based on a plurality of arc fault trip levels which are dependent on a magnitude of said average AC line frequency current.

45. The device according to claim 40, wherein said trigger generator circuit generates said trigger signal based on a plurality of arc fault trip levels which are dependent on a level of AC line frequency current.

46. The device according to claim 35, further comprising an arc detection disabling circuit capable of at least partially disabling at least a portion of said arc fault detector for a finite period of time to permit a user to use an electrical device exhibiting arcing, and enabling said disabled portion of said arc fault detector after use of the electrical device exhibiting arcing has been discontinued.

47. The device according to claim 35, further comprising a fault detector capable of detecting faults other than arc faults, and activating said trigger circuit when a fault other than an arc fault is detected.

48. The device according to claim 47, wherein said fault detector comprises a ground fault circuit interrupter that detects the occurrence of a ground fault and generates a trigger signal in response to the detection of the ground fault that activates said trigger circuit.

49. The device according to claim 47, wherein said fault detector comprises an immersion detection circuit interrupter capable of detecting the occurrence of an immersion fault and generating a trigger signal in response to the detection of the immersion fault that activates said trigger circuit.

50. The device according to claim 47, wherein said fault detector comprises an appliance leakage circuit interrupter capable of detecting the occurrence of an appliance leakage fault and generating a trigger signal in response to the detection of the appliance leakage fault that activates said trigger circuit.

51. A method for detecting arc faults using a circuit interrupting device comprising:

sensing current flowing through the device;

generating a high frequency signal corresponding to a level of high frequency current flowing through the device;

generating an AC line frequency signal corresponding to a level of AC line frequency current flowing through the device;

generating an arc fault trigger signal in response to at least one of a detected arc fault within said high frequency signal and a detected arc fault within said AC line frequency signal; and disconnecting a source of electrical power to a load side of the device in response to said arc fault trigger signal.

52. The method according to claim 51, further comprising inhibiting the disconnecting of the source of electrical power to the load side of the device for a finite period of time to permit use of an electrical device exhibiting arcing connected to the circuit interrupting device, and uninhibiting the disconnection of the source of electrical power to the load side of the device after use of said electrical device has been discontinued.

53. The method according to claim 51, further comprising:

detecting ground faults from said sensed current; and generating a trigger signal when a ground fault is detected, wherein the source of electrical power to the load side of the device is disconnected in response to said trigger signal.

54. The method according to claim 51, further comprising:

detecting immersion detection faults from said sensed current; and generating a trigger signal when an immersion detection fault is detected, wherein the source of electrical power to the load side of the device is disconnected in response to said trigger signal.

55. The method according to claim 51, further comprising:

detecting appliance leakage faults from said sensed current; and generating a trigger signal when an appliance leakage fault is detected, wherein the source of electrical power to the load side of the device is disconnected in response to said trigger signal.

* * * * *